US012397664B2

(12) United States Patent
Rich et al.

(10) Patent No.: US 12,397,664 B2
(45) Date of Patent: Aug. 26, 2025

(54) ELECTRIC VEHICLE CHARGING CONNECTOR ADAPTER NESTED IN AN ELECTRIC VEHICLE SUPPLY EQUIPMENT

(71) Applicant: ChargePoint, Inc., Campbell, CA (US)

(72) Inventors: William Rich, Emerald Hills, CA (US); Parth Sanjiv Gyani, Redwood City, CA (US); Tung-Po Yang, Los Gatos, CA (US); Jacky S. Wong, Sunnyvale, CA (US); Gopalakrishna Ranjan Melpal, Cupertino, CA (US); Jeffrey T. Barone, Saratoga, CA (US); Hossein Kazemi, San Francisco, CA (US); Dennis Michael Heleine, Morgan Hill, CA (US); Masoud Yazdanian, San Jose, CA (US); John Hsudan Yu, Fremont, CA (US)

(73) Assignee: CHARGEPOINT, INC., Campbell, CA (US)

( * ) Notice: Subject to any disclaimer, the term of this patent is extended or adjusted under 35 U.S.C. 154(b) by 0 days.

(21) Appl. No.: 18/897,957

(22) Filed: Sep. 26, 2024

(65) Prior Publication Data
US 2025/0100406 A1   Mar. 27, 2025

Related U.S. Application Data

(60) Provisional application No. 63/585,392, filed on Sep. 26, 2023.

(51) Int. Cl.
*B60L 53/16* (2019.01)
*H01R 31/06* (2006.01)

(52) U.S. Cl.
CPC .............. *B60L 53/16* (2019.02); *H01R 31/06* (2013.01)

(58) Field of Classification Search
CPC .............................. B60L 53/16; H01R 31/06
(Continued)

(56) References Cited

U.S. PATENT DOCUMENTS 8,025,526 B1 * 9/2011 Tormey .............. H01R 13/6397
439/372
11,247,578 B2 * 2/2022 Melatti ................... B60L 53/14
(Continued)

FOREIGN PATENT DOCUMENTS

CN          114179648 A        3/2022
DE   102014215169 A1 *   2/2015   .............. B60L 53/16
(Continued)

OTHER PUBLICATIONS

International Search Report and Written Opinion, PCT App. No. PCT/US2024/048625, Jan. 9, 2025, 13 pages.

*Primary Examiner* — Suresh Memula
(74) *Attorney, Agent, or Firm* — NICHOLSON DE VOS WEBSTER & ELLIOTT LLP

(57) ABSTRACT

A charging connector adapter is nested within a holster of an electric vehicle supply equipment (EVSE). If the adapter is to be used, the EVSE automatically locks the charging connector to the charging connector adapter and unlocks the charging connector adapter from the holster of the EVSE thereby allowing the charging cable with the charging connector adapter to be removed from the holster and used for connecting the charging connector adapter to an inlet of an electric vehicle. When the charging connector adapter is inserted back into the holster, the EVSE locks the charging connector to the holster and unlocks the charging connector from the charging connector adapter.

20 Claims, 30 Drawing Sheets

(58) Field of Classification Search
USPC .......................................................... 320/109
See application file for complete search history.

(56) References Cited

U.S. PATENT DOCUMENTS

| | | | | |
|---|---|---|---|---|
| 2007/0278996 | A1* | 12/2007 | So | H01R 13/447 |
| | | | | 320/107 |
| 2013/0169226 | A1 | 7/2013 | Read | |
| 2013/0271079 | A1* | 10/2013 | Tanneberger | B60L 53/16 |
| | | | | 320/109 |
| 2014/0111157 | A1* | 4/2014 | Ono | B60L 50/16 |
| | | | | 320/109 |
| 2015/0048791 | A1* | 2/2015 | Veiga | B60L 53/14 |
| | | | | 320/109 |
| 2015/0224887 | A1* | 8/2015 | Toth | B60L 53/65 |
| | | | | 320/109 |
| 2023/0108220 | A1* | 4/2023 | Van Der Weijde | B60L 53/35 |
| | | | | 320/109 |
| 2023/0166613 | A1 | 6/2023 | Braunstein | |

FOREIGN PATENT DOCUMENTS

| | | | | |
|---|---|---|---|---|
| JP | 2018082601 A | 5/2018 | | |
| WO | 2015/084106 A1 | 6/2015 | | |
| WO | WO-2023205304 A1 * | 10/2023 | | B60L 53/16 |

* cited by examiner

| STATE | PRESENCE SENSOR | PILOT VOLTAGE | PROX VOLTAGE | STATUS |
|---|---|---|---|---|
| 1A | TRUE | 10V TO 11V | .1V TO .5V | CONNECTOR ATTACHED TO ADAPTER AND INSERTED INTO HOLSTER |
| 1B | TRUE | 10V TO 11V | .5V TO 1V | CONNECTOR ATTACHED TO ADAPTER AND INSERTED INTO HOLSTER, BUTTON PRESSED |
| 2A | FALSE | 10V TO 11V | .1V TO 5V | CONNECTOR ATTACHED TO ADAPTER AND NOT IN HOLSTER, LATCH BUTTON NOT PRESSED |
| 2B | FALSE | 10V TO 11V | .5V TO 1V | CONNECTOR ATTACHED TO ADAPTER AND NOT IN HOLSTER, LATCH BUTTON PRESSED |
| 3 | TRUE | 11V TO 13V | LESS .1V | CONNECTOR NOT ATTACHED TO ADAPTER, ADAPTER IN HOLSTER |
| 4 | FALSE | 11V TO 13V | LESS .1V | CONNECTOR NOT ATTACHED TO ADAPTER, ADAPTER NOT IN HOLSTER |
| 5A | FALSE | LESS 10V | 1V TO 2V | CONNECTOR ATTACHED TO ADAPTER AND PLUGGED INTO EV |
| 5B | FALSE | LESS 10V | ABOVE 2V | CONNECTOR ATTACHED TO ADAPTER AND PLUGGED INTO EV & BUTTON PRESSED |

FIG. 31

ELECTRIC VEHICLE CHARGING CONNECTOR ADAPTER NESTED IN AN ELECTRIC VEHICLE SUPPLY EQUIPMENT

CROSS-REFERENCE TO RELATED APPLICATIONS

This application claims the benefit of U.S. Provisional Application No. 63/585,392, filed Sep. 26, 2023, which is hereby incorporated by reference.

FIELD

Embodiments of the invention relate to the field of electric vehicle charging; and more specifically, to an electric vehicle charging connector adapter nested in an electric vehicle supply equipment.

BACKGROUND

There are different electric vehicle charging connector types that take different physical forms. Example connector types include: IEC 62196 Type 1 (defined in IEC 62196-1: 2022, published May 3, 2022, and sometimes referred to as SAE J1772), IEC 62196 Type 2 (defined in IEC 62196-2: 2022, published Oct. 19, 2022, and sometimes referred to as Mennekes), Combined Charging System (CCS) Combo 1 (CCS1) (defined in IEC 62196-3:2022, configuration EE), CCS Combo 2 (CCS2) (defined in IEC 62196-3:2022, configuration FF), CHAdeMO (defined in IEC 62196-3: 2022, configuration AA), and North American Charging Standard (NACS). An electric vehicle typically has an inlet that is designed to use a particular charging connector type. Different charging protocols may exist for different connector types. Standalone adapters exist to adapt from one connector type to another.

SUMMARY

In one aspect, a method in the EVSE is performed including locking a charging connector adapter to a holster of the EVSE, where the charging connector adapter is nested within the holster of the EVSE; determining that an electric vehicle that is to be charged at the EVSE through a charging cable with a charging connector is to use the charging connector adapter; automatically locking the charging connector to the charging connector adapter; automatically unlocking the charging connector adapter from the holster of the EVSE thereby allowing the charging cable with the charging connector adapter to be removed from the holster and used for connecting the charging connector adapter to an inlet of the electric vehicle; and responsive to the charging connector adapter being inserted back into the holster, locking the charging connector adapter to the holster of the EVSE, and unlocking the charging connector from the charging connector adapter.

The charging connector may be Combined Charging System (CCS) Combo 1 compliant, and the charging connector adapter may be adapted to connect to an electric vehicle inlet that is North American Charging Standard (NACS) compliant. Automatically locking the charging connector to the charging connector adapter may include deactivating an electromagnet that moves a locking pin of the charging connector adapter to a locked position thereby preventing a latch of the charging connector to be unlatched, where the electromagnet is external to the charging connector adapter. Automatically locking the charging connector to the charging connector adapter may include using a linear actuator to disengage a locking pin of the charging connector adapter with a ball-lock quick release pin to move the locking pin to a locked position thereby preventing a latch of the charging connector to be unlatched. Automatically locking the charging connector to the charging connector adapter may include using a linear actuator to move a first magnet of the holster to a position where a magnetic force of the first magnet does not attract a second magnet that is attached to a latch of the charging connector adapter thereby preventing a latch of the charging connector to be unlatched. Automatically unlocking the charging connector adapter from the holster of the EVSE may include retracting a spring-loaded latch that latches to the charging connector adapter. Determining that the first electric vehicle that is to be charged at the EVSE through the charging cable with the charging connector is to use the charging connector adapter may include receiving a communication that specifies or indicates an intention to use the charging connector adapter.

BRIEF DESCRIPTION OF THE DRAWINGS

The invention may best be understood by referring to the following description and accompanying drawings that are used to illustrate embodiments of the invention. In the drawings:

FIG. 31 is a table that shows exemplary states according to an embodiment.

DESCRIPTION OF EMBODIMENTS

Figure 1:
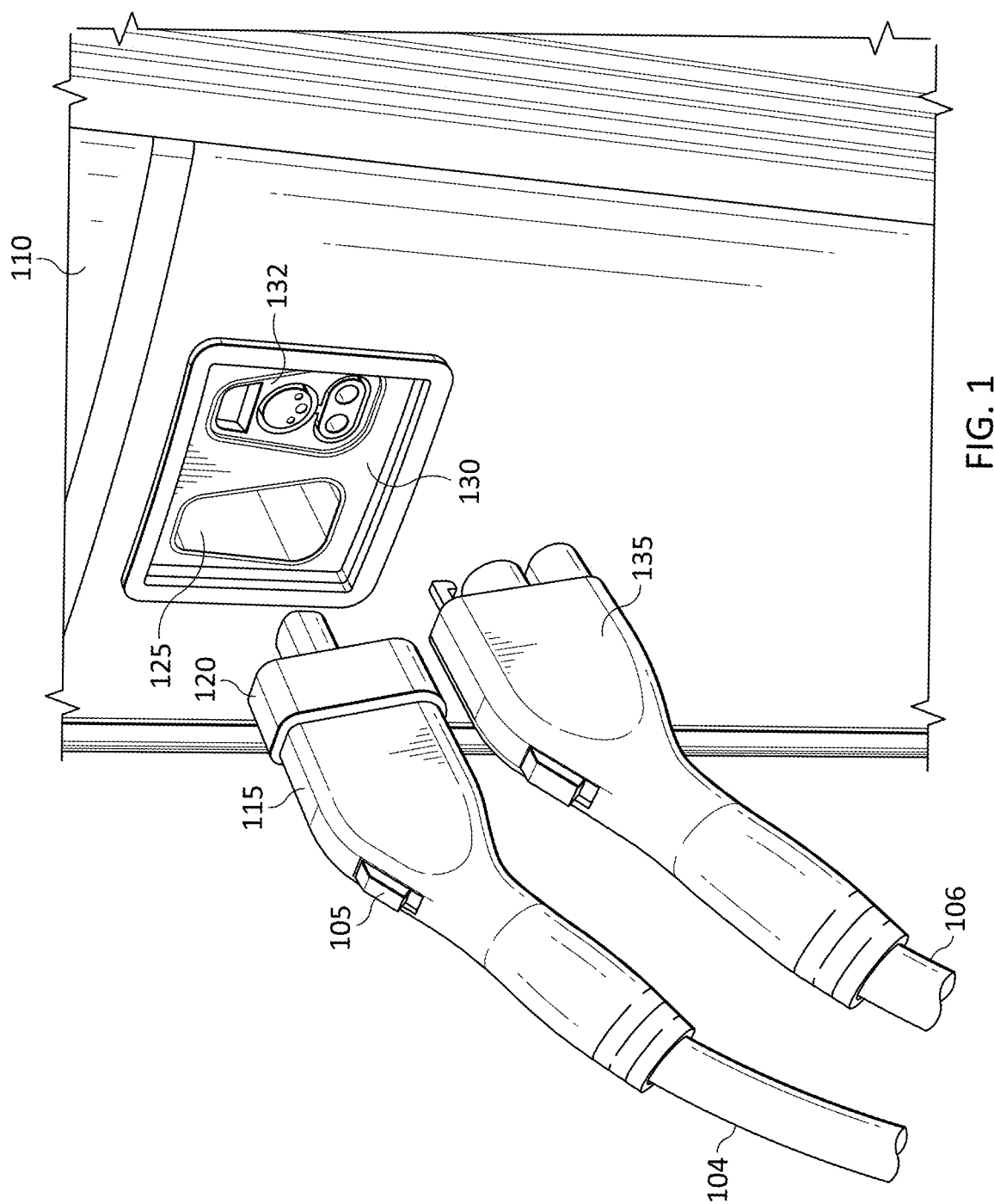
FIG. 1 shows a portion of an electric vehicle supply equipment (EVSE) that includes an adapter that is nested within the EVSE according to an embodiment.

An electric vehicle charging connector adapter ("adapter") is nested within an electric vehicle supply equipment (EVSE). The EVSE has an attached charging cable where one end is secured at the EVSE and the other end terminates with a first connector type that is designed for use for electric vehicles with a corresponding inlet type. The EVSE includes a component that holds the charging cable and connector when not in use. This component is sometimes referred herein as a "holster." The adapter is for a second connector type that is designed for electric vehicle inlets that correspond with the second connector type. The adapter is nested and locked within the holster. When the adapter is to be used (e.g., the electric vehicle to be charged has an inlet that corresponds with the second connector type), the adapter is locked to the connector of the charging cable and the adapter is unlocked from the holster. When the adapter is not to be used (e.g., the electric vehicle to be charged has an inlet that corresponds with the first connector type), the adapter is not locked to the connector.

In an embodiment, the adapter is locked to the connector when the connector is connected to the holster in an idle state. In such an embodiment, if the adapter is not to be used (e.g., the electric vehicle to be charged has an inlet that corresponds with the first connector type), the adapter is automatically unlocked from the connector. The adapter may remain locked to the holster. The vehicle operator may then remove the connector from the holster and plug the connector into their electric vehicle. Responsive to the connector being inserted back into the holster, the adapter is automatically locked to the connector. If, however, the adapter is to be used (e.g., the electric vehicle to be charged has an inlet that corresponds with the second connector type), the adapter is unlocked from the holster and the vehicle operator may then remove the connector with the attached adapter from the holster and plug the adapter into their electric vehicle. Responsive to the connector with the attached adapter being inserted back into the holster, the adapter is locked to the holster.

In another embodiment, the adapter is not locked to the connector when the connector is connected to the holster in an idle state. In such an embodiment, if the adapter is not to be used (e.g., the electric vehicle to be charged has an inlet that corresponds with the first connector type), the vehicle operator may remove the connector from the holster and plug the connector into their electric vehicle. The adapter may remain locked to the holster. If, however, the adapter is to be used (e.g., the electric vehicle to be charged has an inlet that corresponds with the second connector type), the adapter is automatically locked to the connector and the adapter is automatically unlocked from the holster. The vehicle operator may then remove the connector with the attached adapter from the holster and plug the adapter into their electric vehicle. Responsive to the connector with the attached adapter being inserted back into the holster, the adapter is automatically unlocked from the connector and the adapter is locked to the holster.

In an embodiment, the EVSE locks the adapter to the holster with a spring-loaded latch controlled by a linearly actuated motor. The EVSE detects whether the adapter is present. The EVSE may include a sensor for detecting whether the adapter is present. As examples, the sensor may be a magnetic field sensor (e.g., a Reed switch, a Hall effect sensor), an optical sensor, an infrared sensor, a mechanical leaf or pushbutton switch, an inductive proximity sensor, or a capacitive proximity sensor. In addition to, or in lieu of, a sensor, the EVSE may detect whether the adapter is present through a proximity/pilot connection pin to detect electrical continuity. The EVSE unlocks the adapter only when the EVSE detects that the adapter is present. After a time duration, the latch returns to the locked position. The adapter can be inserted back into the holster with the latch in the locked position by overcoming the spring force.

In an embodiment, the EVSE controls the locking and unlocking of the adapter to the connector using a locking pin contained within the adapter controlled by an electromagnet that is external to the adapter. The locking pin is spring loaded to the locked position. To move the locking pin to an unlocked state, the electromagnet is activated thereby moving the locking pin to an unlocked position. The unlocked position allows the latch of the connector to be unlatched. To return the locking pin to the locked state, the electromagnet is deactivated causing the spring of the locking pin to return the locking pin to the locked state. This solution may be fully sealed (e.g., no potential for liquid ingress) with no holes for mechanical mechanisms or electrical signal points. The adapter is passively locked with no powered components in the adapter.

In an embodiment, the EVSE controls the locking and unlocking of the adapter to the connector using a locking pin contained with an adapter with an undercut slot for a ball-lock quick release. The locking pin is spring loaded to the locked position. The EVSE has a ball-lock quick release pin with linear actuation. The EVSE pin engages the adapter locking pin and overcomes the spring force to move the locking pin to an unlocked position thereby unlocking the latch of the connector.

In an embodiment, the EVSE controls the locking and unlocking of the adapter to the connector using a latch with an attached magnet that is controlled by a magnet that is external to the adapter. The adapter latch can be spring loaded to the locked position. The EVSE has a linearly actuated motor that controls the movement of the external magnet. To unlock the connector from the adapter, the EVSE moves the external magnet to a position such that the magnetic force of the external magnet attracts the attached magnet of the latch to prevent the latch of the adapter from latching to the latch of the connector. In such an embodiment, actuating the connector latch may be used to terminate a charging session and/or trigger the opening of a door of an electric vehicle inlet.

The determination to use the adapter can be done in different ways. The EVSE may receive a communication originating from the electric vehicle operator that specifies or indicates an intention to use the adapter. For example, the electric vehicle operator may specify the type of vehicle to be charged (e.g., year, model, make) and the EVSE may determine whether that type of vehicle needs the adapter. As another example, the electric vehicle operator may specify the type of connector their vehicle uses. The electric vehicle operator may provide this information using a mobile application, using a web application, using an on-board infotainment system on their vehicle, using a user interface of the EVSE and/or pressing the latch button of the connector for a predetermined duration and/or a number of times within a predetermined period. The EVSE may receive this communication from a server, from a communication device of the vehicle operator (e.g., a WLAN or WPAN device), from the electric vehicle (e.g., wireless connection between the electric vehicle and the EVSE), or directly from a user interface of the EVSE. This information can be provided at the time of charging or may be provided prior to charging and saved in a profile associated with the vehicle and/or operator. This information may be provided as part of a request for charging service. As another example, the EVSE may perform a vehicle recognition (e.g., using a camera on the EVSE) and determine whether the adapter is needed.

In an embodiment the EVSE may include multiple charging cables and multiple charging connectors. If multiple charging cables and connectors are connected to their respective holsters, the EVSE controls the locking or unlocking of the adapter for each of these multiple connectors if the EVSE does not know which cable the vehicle operator intends to use. For example, if an adapter is to be used, the adapter for each corresponding charging connector is locked to that connector and each of those adapters is unlocked from its respective holster. The unused one or more charging connector with adapters are each put back into its idle state (e.g., those adapter(s) are locked to their respective holster). Determining the unuse or use of a particular charging connector may be done by a timer expiring, a signal received when one of the charging connectors with an adapter is removed from the EVSE, or a signal received when one of the charging connectors with an adapter is inserted into an electric vehicle.

If the adapter is lost or stolen (e.g., removed from the connector after removal of the connector with the adapter attached), the EVSE may record the identifier of the vehicle operator that used the adapter.

FIG. 1 shows a portion of an electric vehicle supply equipment (EVSE) 110 that includes an adapter that is nested within the EVSE 110 according to an embodiment. The EVSE 110 shown FIG. 1 shows two charging cables and connectors for charging (the cable 104 with the connector 115, and the cable 106 with the connector 135). However, the number of charging cables and connectors is exemplary as the EVSE may include a single cable and connector or more than two charging cables and connectors. The EVSE 110 includes a component that holds an adapter when not in use and can also hold the attached connector when not in use. This component is sometimes referred herein as a "holster." There can be a separate holster for each separate charging cable and connector. As illustrated in FIG. 1, the holster 125 and the holster 130 are designed to nest the charging connector adapter 120 and 132 respectively. The charging connector adapter 132 is shown—as being nested within the holster 130. The charging connector adapter 120 is shown as being attached to the connector 115.

Figure 2:
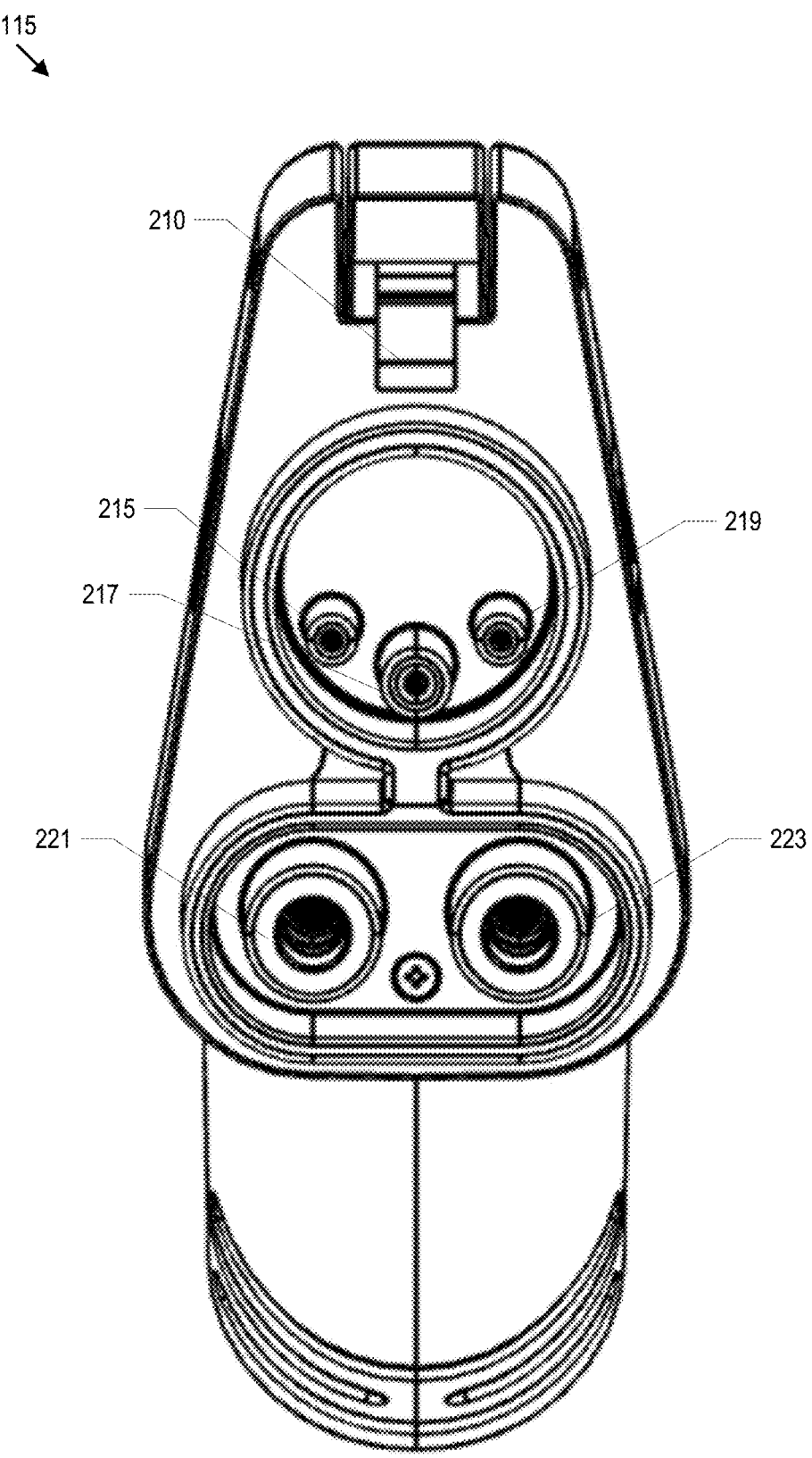
FIG. 2 is a front view of an exemplary charging connector according to an embodiment.
Figure 3:
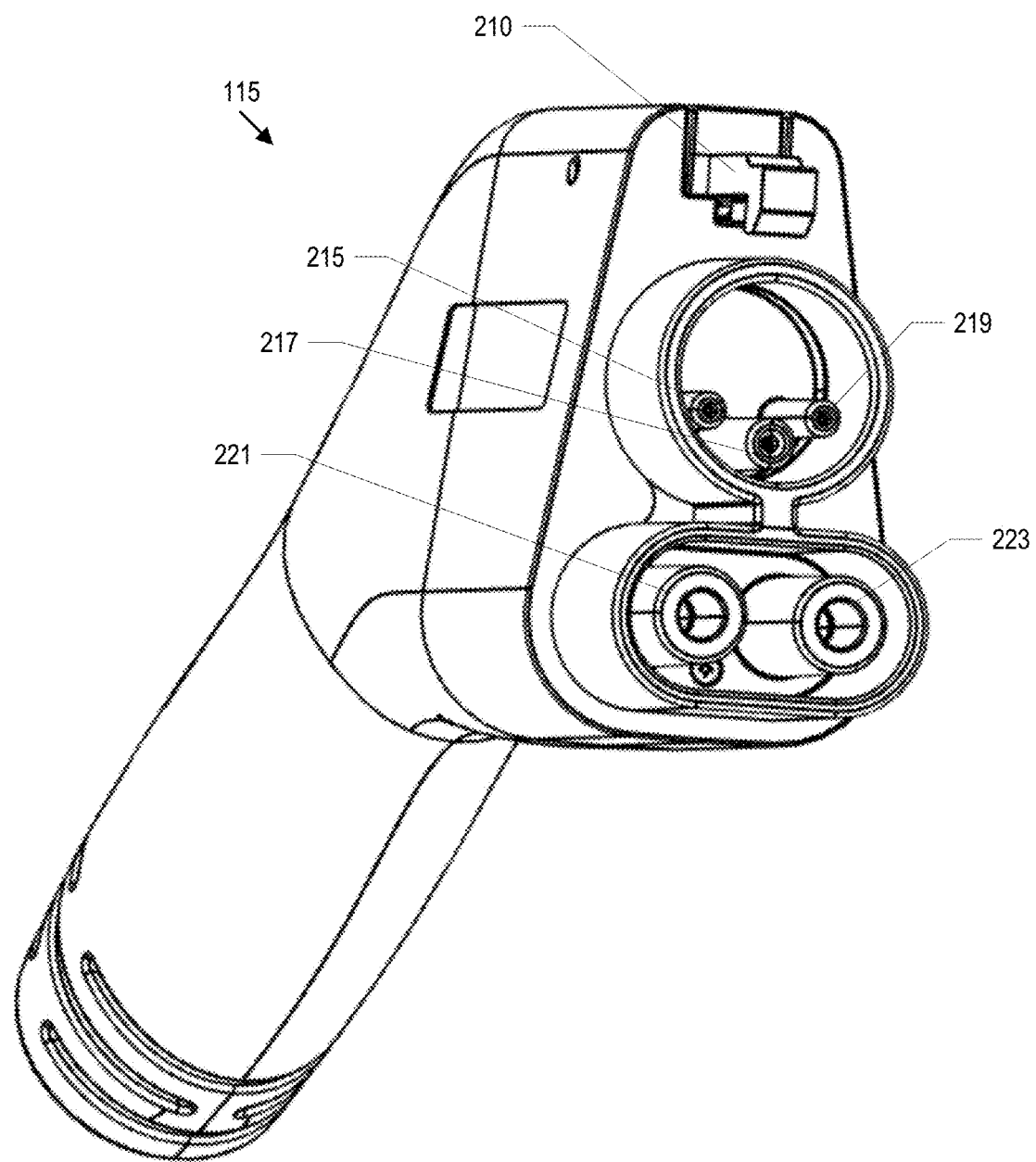
FIG. 3 is a perspective side view of the exemplary charging connector of FIG. 2.

FIG. 2 is a front view of an exemplary charging connector 115 according to an embodiment. FIG. 3 is a perspective side view of the exemplary charging connector 115 of FIG. 2. The exemplary charging connector 115 is compliant with the Combined Charging System (CCS) Combo 1 standard. The connector 115 includes a connector latch 210. The connector latch 210 may be used to latch and unlatch the connector 115 to vehicle inlets. As will be described in greater detail later herein, the connector latch 210 is used to lock an adapter 120 on the connector latch 210. The connector 115 includes a number of contacts that mate with corresponding conductive components (e.g., pins) of a vehicle inlet. Also, the connector 115 is designed to mate with the adapter 120. As illustrated in FIGS. 2 and 3, the connector 115 includes the proximity detection contact 215, the ground contact 217, the pilot contact 219, the power contact 221, and the power contact 223.

The proximity detection contact 215 carries a proximity signal that is used by an electric vehicle to detect the presence of the connector 115 in its electric vehicle charging inlet. Proximity detection may be tied to a drive interlock system on the electric vehicle to prevent the electric vehicle from being started while the connector 115 is plugged in the electric vehicle. The proximity detection contact 215 is connected to a proximity detection circuit in the connector 115. The ground contact 217 is a grounding conductor between the EVSE 110 and an electric vehicle (when plugged into the electric vehicle charging inlet of that electric vehicle). The ground contact 217 provides a return path for the control pilot and a reference for the control pilot and proximity voltage measurements.

The pilot contact 219 is used to carry a control pilot signal from the EVSE 110. The pilot signal may be used to determine whether an electric vehicle is ready to accept energy, to communicate the charging station's maximum available current capacity, determine whether indoor ventilation is required, and verify the grounding circuitry.

Figure 4:
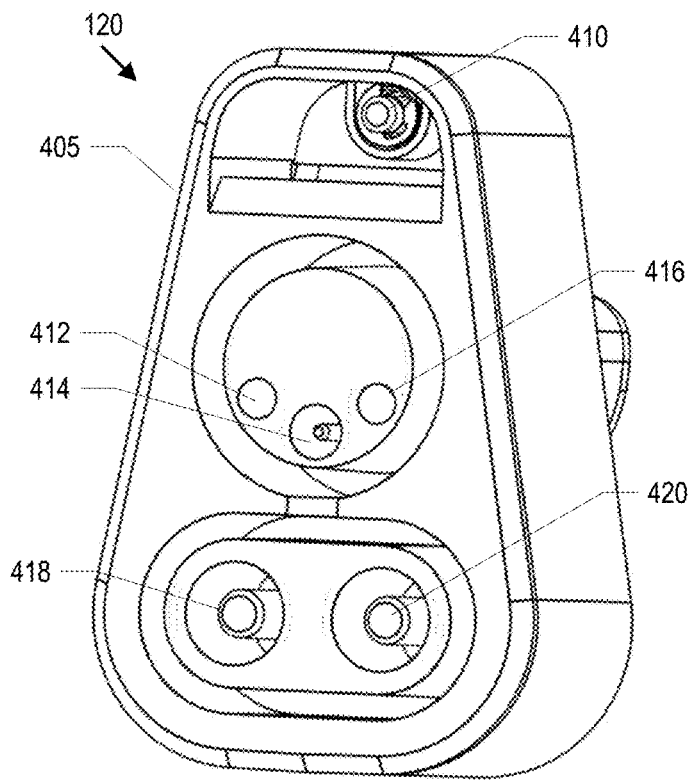
FIG. 4 is a perspective view of a first side of the adapter according to an embodiment.
Figure 5:
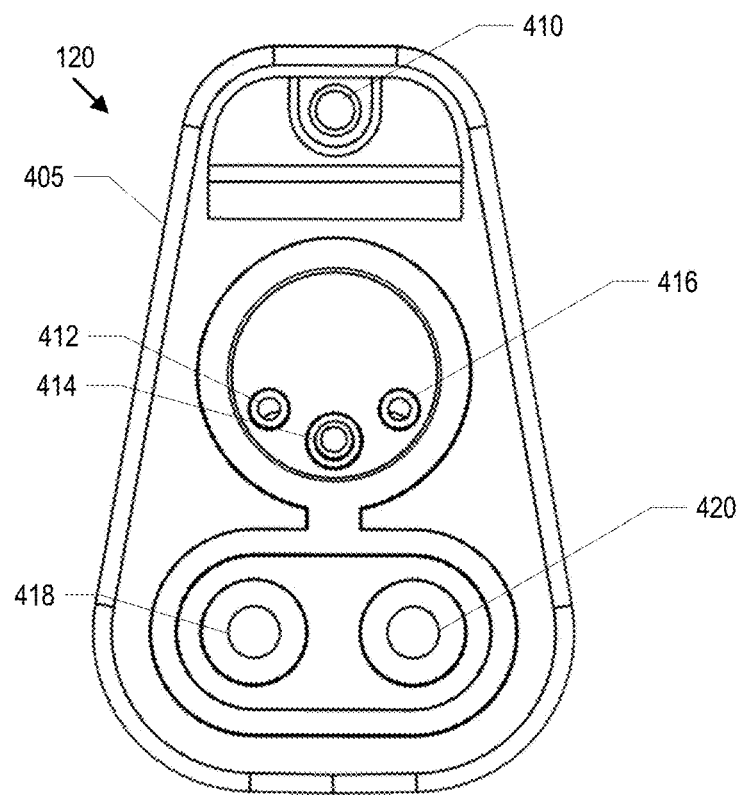
FIG. 5 is a front view of the first side of the adapter.

FIG. 4 is a perspective view of a first side of the adapter 120 according to an embodiment. FIG. 5 is a front view of the first side of the adapter 120. The first side of the adapter 120 is the side that mates with the connector 115 and is referred herein as the adapter inlet 405. The adapter inlet 405 includes conductive components (e.g., pins) that mate with corresponding contacts of the connector 115. The adapter inlet 405 includes the conductive component 412 that mates with the pilot contact 219, the conductive component 414 that mates with the ground contact 217, the conductive component 416 that mates with the proximity detection contact 215, the conductive component 418 that mates with the power contact 223, and the conductive component 420 that mates with the power contact 221. The adapter inlet 405 is compliant with the CCS1 standard. The adapter 120 also includes the adapter locking pin 410. The EVSE 110 controls the locking and unlocking of the adapter 120 to the connector 115 using the adapter locking pin 410. In an embodiment, the adapter locking pin 410 is used to lock and unlock the connector latch 210 of the connector 115.

Figure 6:
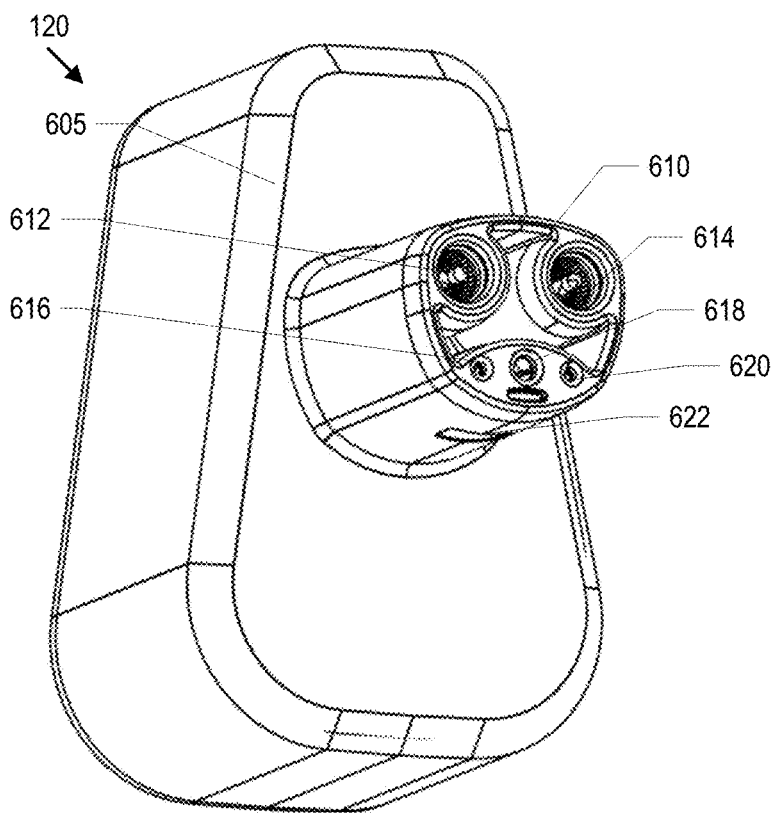
FIG. 6 is a perspective view of a second side of the adapter according to an embodiment.
Figure 7:
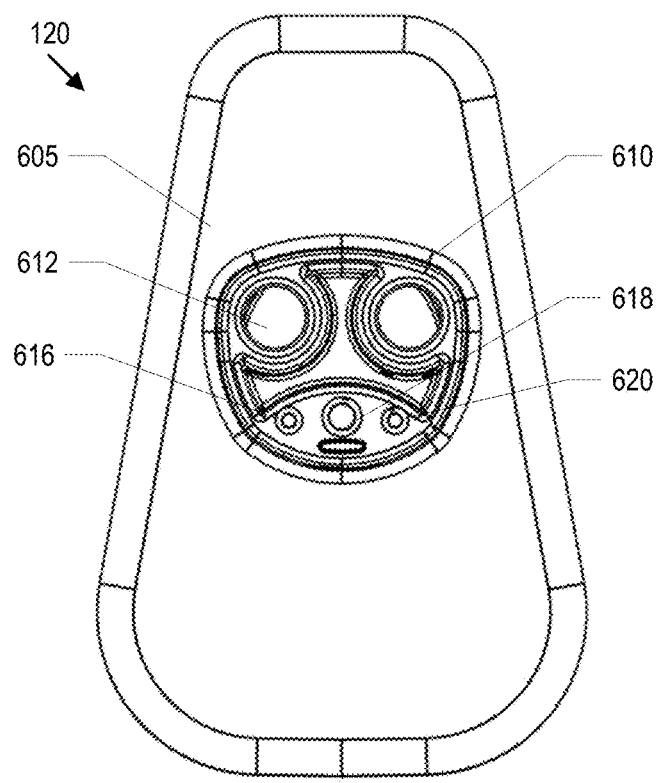
FIG. 7 is a front view of the second side of the adapter.

FIG. 6 is a perspective view of a second side of the adapter 120 according to an embodiment. FIG. 7 is a front view of the second side of the adapter 120. The second side of the adapter 120 is the side that connects with an electric vehicle inlet when charging an electric vehicle, and connects with an adapter housing of the EVSE. This side of the adapter 120 includes the housing 605 that houses the adapter connector 610. The adapter connector 610 includes a number of contacts that mate with corresponding conductive components (e.g., pins) of a vehicle inlet. Also, the adapter connector 610 is designed to mate with an adapter housing of the EVSE when not in use. The adapter connector 610 includes the power contact 612, the power contact 614, the proximity pilot contact 616, the ground contact 618, and the control pilot contact 620. The power contact 612 and the power contact 614 are used to carry power. The adapter connector 610 also includes a cutout 622 that is used for locking the adapter connector 610 into a vehicle inlet and used for locking the adapter connector 610 into the holster. The adapter connector 610 is compliant with the North American Charging Standard.

The proximity pilot contact 616 is used to determine the status of the adapter connector 610 in an electric vehicle charging inlet (e.g., disconnected, latched, unlatched). Proximity detection may be tied to a drive interlock system on the electric vehicle to prevent the electric vehicle from being started while the adapter connector 610 is plugged in the electric vehicle.

The ground contact 618 is a grounding conductor between the EVSE 110 and an electric vehicle (when plugged into the electric vehicle charging inlet of that electric vehicle). The ground contact 618 provides a return path for the control pilot.

Figure 8:
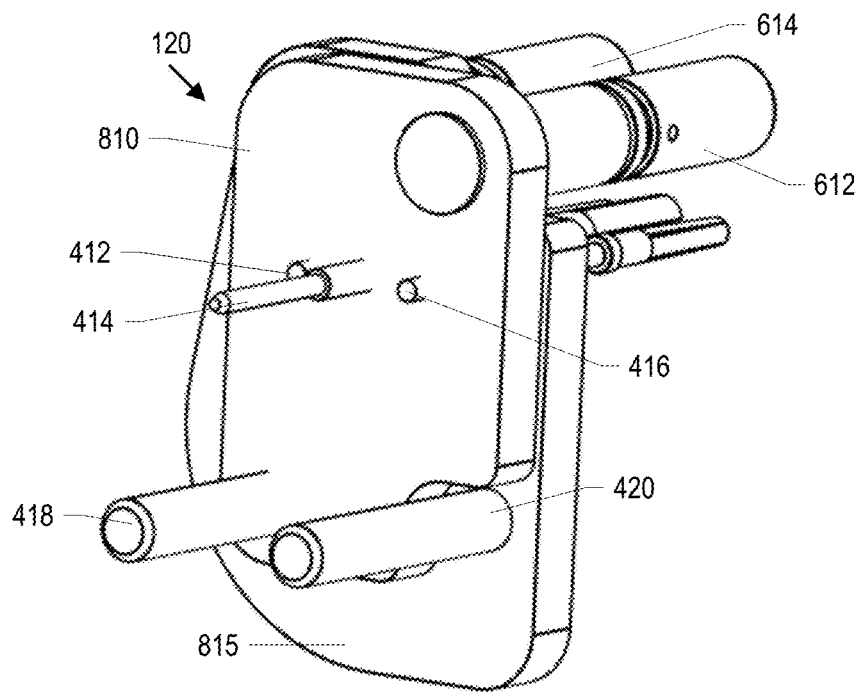
FIG. 8 is a first view of the internal components of the adapter for electrically connecting the conductive components of the first side of the adapter with the contacts of the second side of the adapter according to an embodiment.
Figure 9:
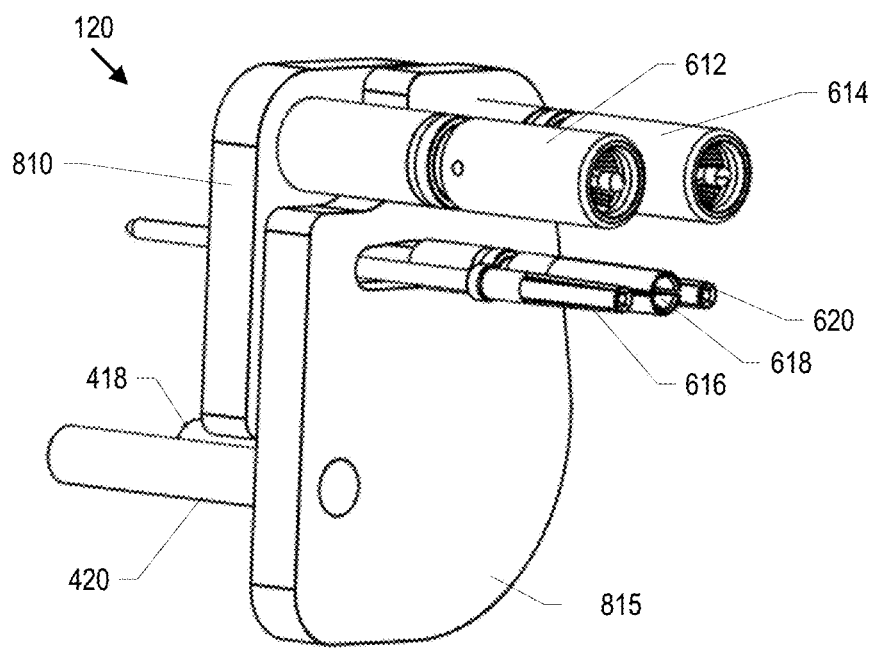
FIG. 9 is a second view of the internal components of the adapter shown in FIG. 8.

The control pilot contact 620 is used to carry a control pilot signal from the EVSE 110. The control pilot signal is used as a digital communication path between the EVSE 110 and the electric vehicle. The control pilot signal may also be used to determine whether an electric vehicle is ready to accept energy, to communicate the charging station's maximum available current capacity, determine whether indoor ventilation is required, and verify the grounding circuitry The adapter 120 electrically connects the conductive components of the first side of the adapter 120 with the contacts of the second side of the adapter 120. FIG. 8 is a first view of the internal components of the adapter 120 for electrically connecting the conductive components of the first side of the adapter 120 with the contacts of the second side of the adapter 120. FIG. 9 is a second view of the same. FIGS. 8 and 9 do not show the enclosure of the first side or the enclosure of the second side of the adapter 120. The adapter 120 includes the busbar 810 and the busbar 815. The busbar 810 electrically connects the power conductive component 418 with the power contact 612. The busbar 815 electrically connects the power conductive component 420 with the power contact 614. The conductive component 412 is electrically connected to the control pilot contact 620 and carries the control pilot signal. The conductive component 414 is electrically connected to the ground contact 618. The conductive component 416 is electrically connected to the proximity pilot contact 616 and is used to determine proximity.

Figure 10:
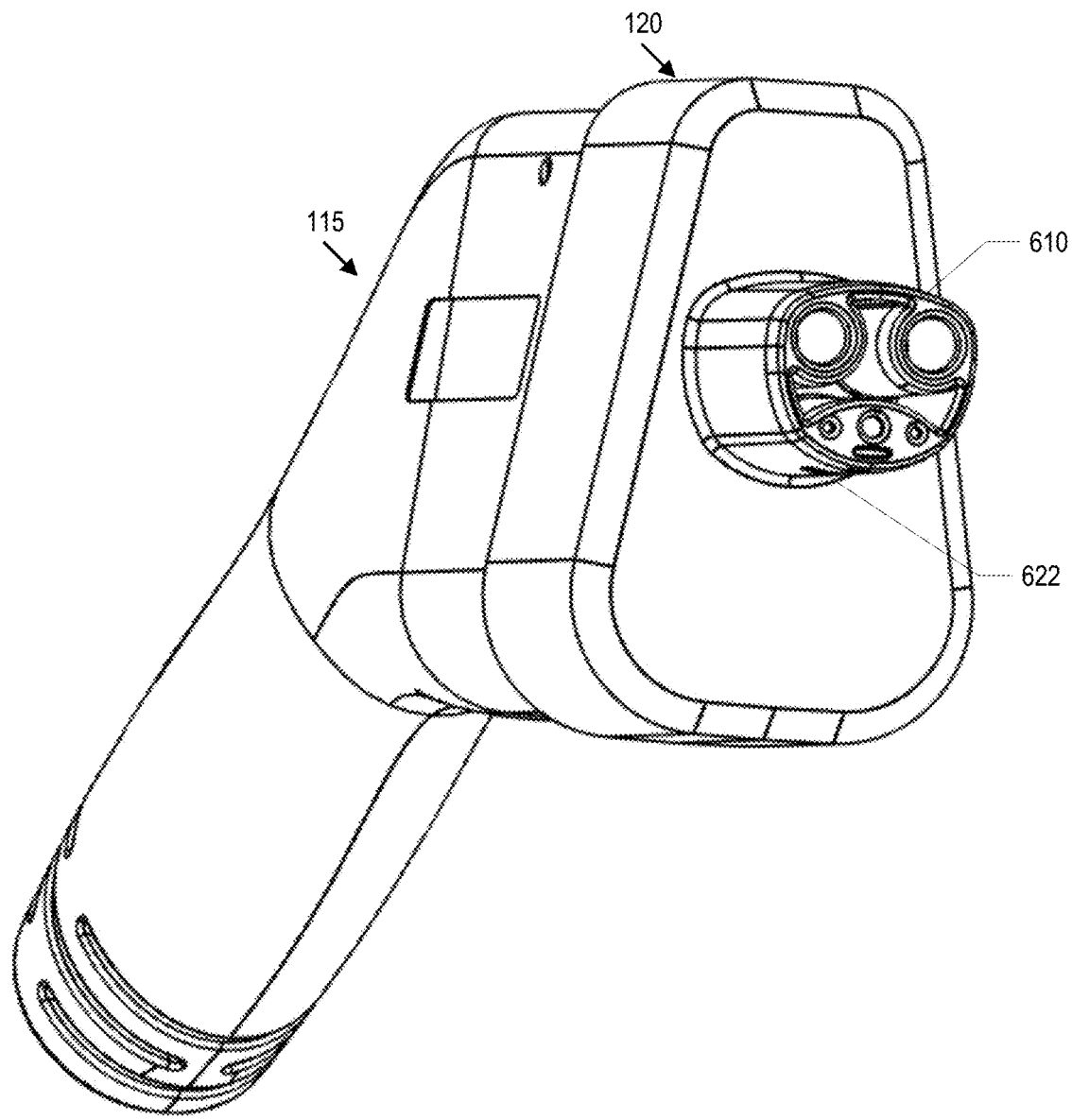
FIG. 10 is a perspective view of the adapter connected to the connector according to an embodiment.
Figure 11:
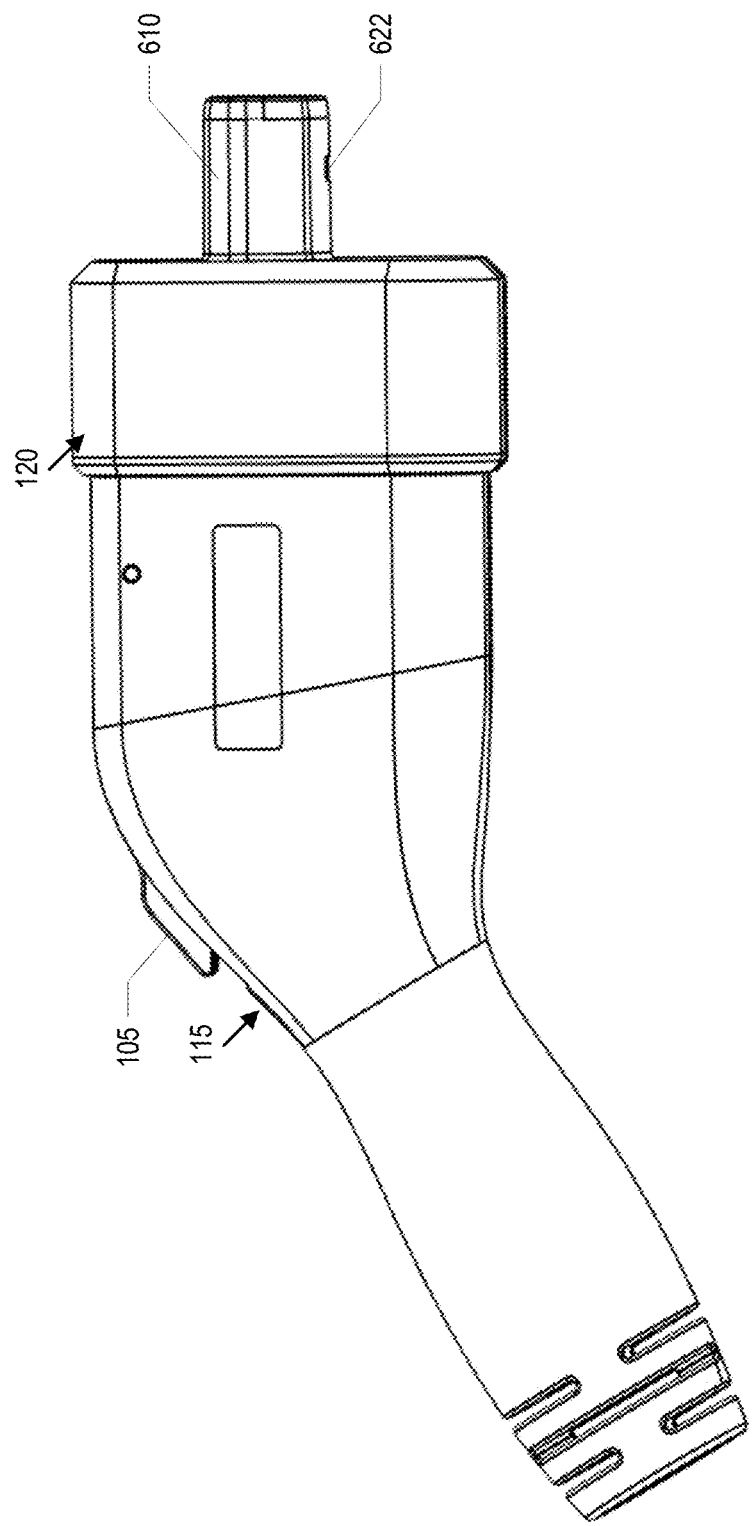
FIG. 11 is a side view of the adapter connected to the connector shown in FIG. 10.

FIG. 10 is a perspective view of the adapter 120 connected to the connector 115 according to an embodiment. FIG. 11 is a side view of the adapter 120 connected to the connector 115. As can be seen in these Figures, the end of the connector 115 fits within the adapter 120 and the adapter connector 610 extends from the adapter 120. FIG. 11 also shows the button 105 that can be pushed by a user to release the latch 210. FIG. 10 shows an embodiment where the locking pin of the adapter 120 is designed to interact with an external electromagnet. In an embodiment where the locking and unlocking of the adapter to the connector uses a locking pin that is engaged with an external pin (e.g., FIGS. 20-23), the adapter 120 includes an opening for the insertion and removal of the external pin.

Figure 12:
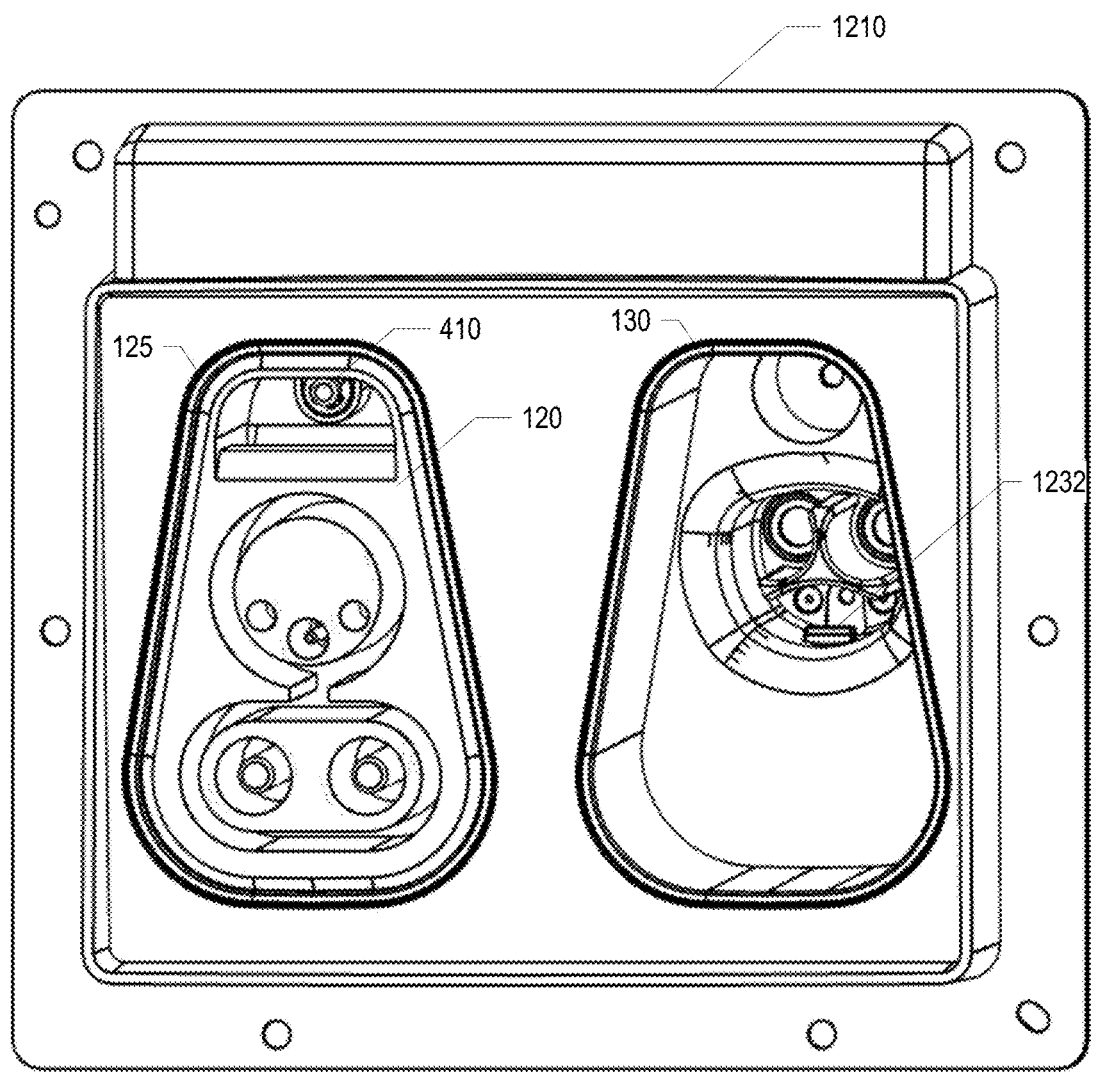
FIG. 12 shows a holster arrangement that includes two holsters that are each capable of holding a connector when not in use according to an embodiment.

FIG. 12 shows a holster arrangement that includes two holsters that are each capable of holding a connector when not in use according to an embodiment. Although the holster arrangement 1210 includes two holsters (one for each charging connector), the number of holsters is exemplary as the EVSE may include a single charging cable and connector and a single holster, or more than two charging cables and connectors and more than two corresponding holsters. For illustrative purposes, the adapter 120 is shown as being nested within the holster 125 and there is no adapter shown nested in the holster 130.

Figure 13:
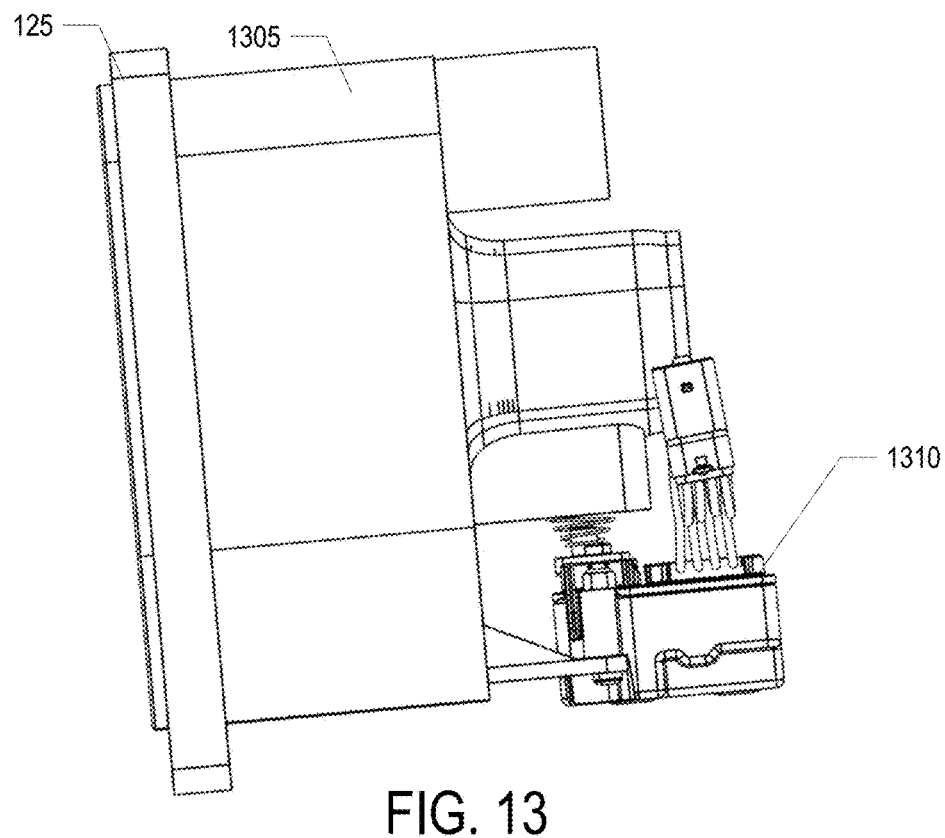
FIG. 13 shows a side view of a holster according to an embodiment.
Figure 14:
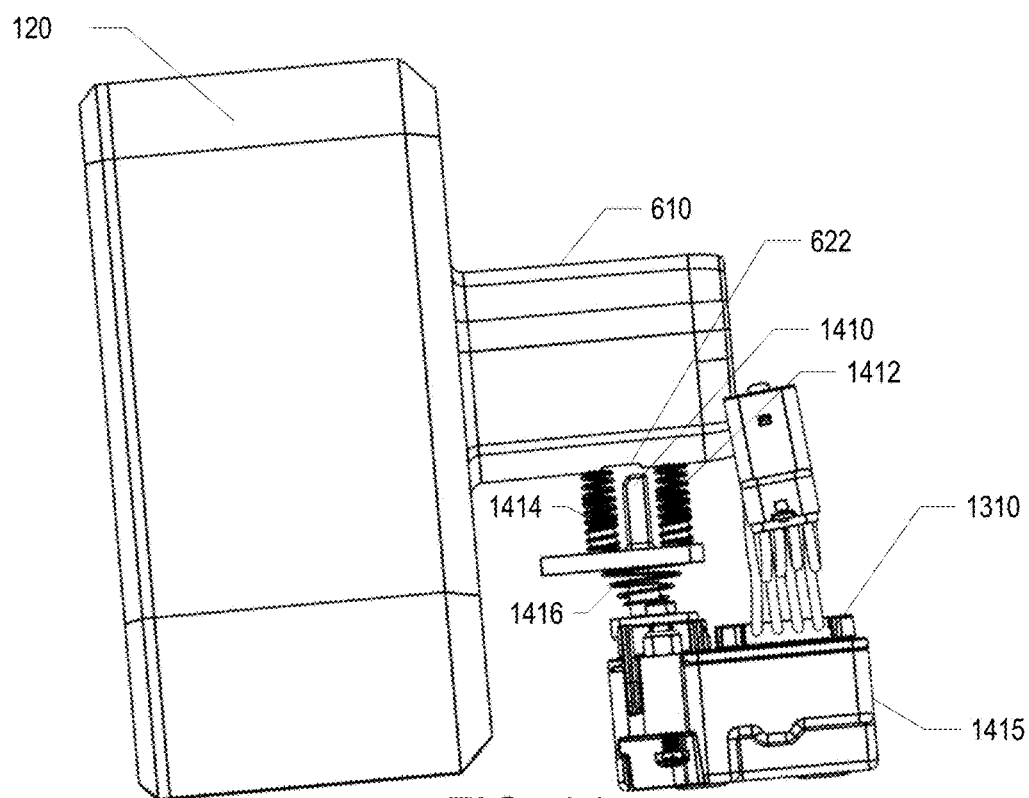
FIG. 14 shows the side view of the holster of FIG. 13 without the holster housing.

FIG. 13 shows a side view of a holster 125 according to an embodiment and FIG. 14 shows the side view of the holster 125 without the holster housing 1305. The adapter 120 nests within the holster 125. The holster 125 includes the adapter locking unit 1310 to lock and unlock the adapter 120 to and from the holster 125. When the adapter 120 is not being used (e.g., it is not to be connected to the connector 115), the adapter locking unit 1310 locks the adapter 120 to the holster 125. This prevents the adapter 120 from being removed from the holster 125 for unauthorized purposes.

The adapter locking unit 1310 includes the latch 1410 that is a spring-loaded latch that is controlled by the linearly actuated motor 1415. The adapter locking unit 1310 includes the compression spring 1412, the compression spring 1414, and the compression spring 1416. The latch 1410 is in an extended (locked position) to lock the adapter 120 to the holster 125. The latch 1410 extends through the cutout 622 of the adapter 120 to lock the adapter 120. In an embodiment, the EVSE 110 only unlocks the adapter 120 (e.g., retract the latch 1410) when the EVSE 110 detects (e.g., with a sensor and/or through a pilot signal/proximity signal) that the adapter 120 is present. As examples, the sensor may be a magnetic field sensor (e.g., a Reed switch, a Hall effect sensor), an optical sensor, an infrared sensor, a mechanical leaf or pushbutton switch, an inductive proximity sensor, or a capacitive proximity sensor.

The EVSE 110 may return the latch 1410 to a locked position after a time duration. The adapter 120 can be inserted back to the holster 125 with the latch 1410 in a locked position by overcoming the spring force. For example, referring to FIG. 12, the latch 1232 is in a locked position and there is no adapter present in the holster 130.

Figure 15:
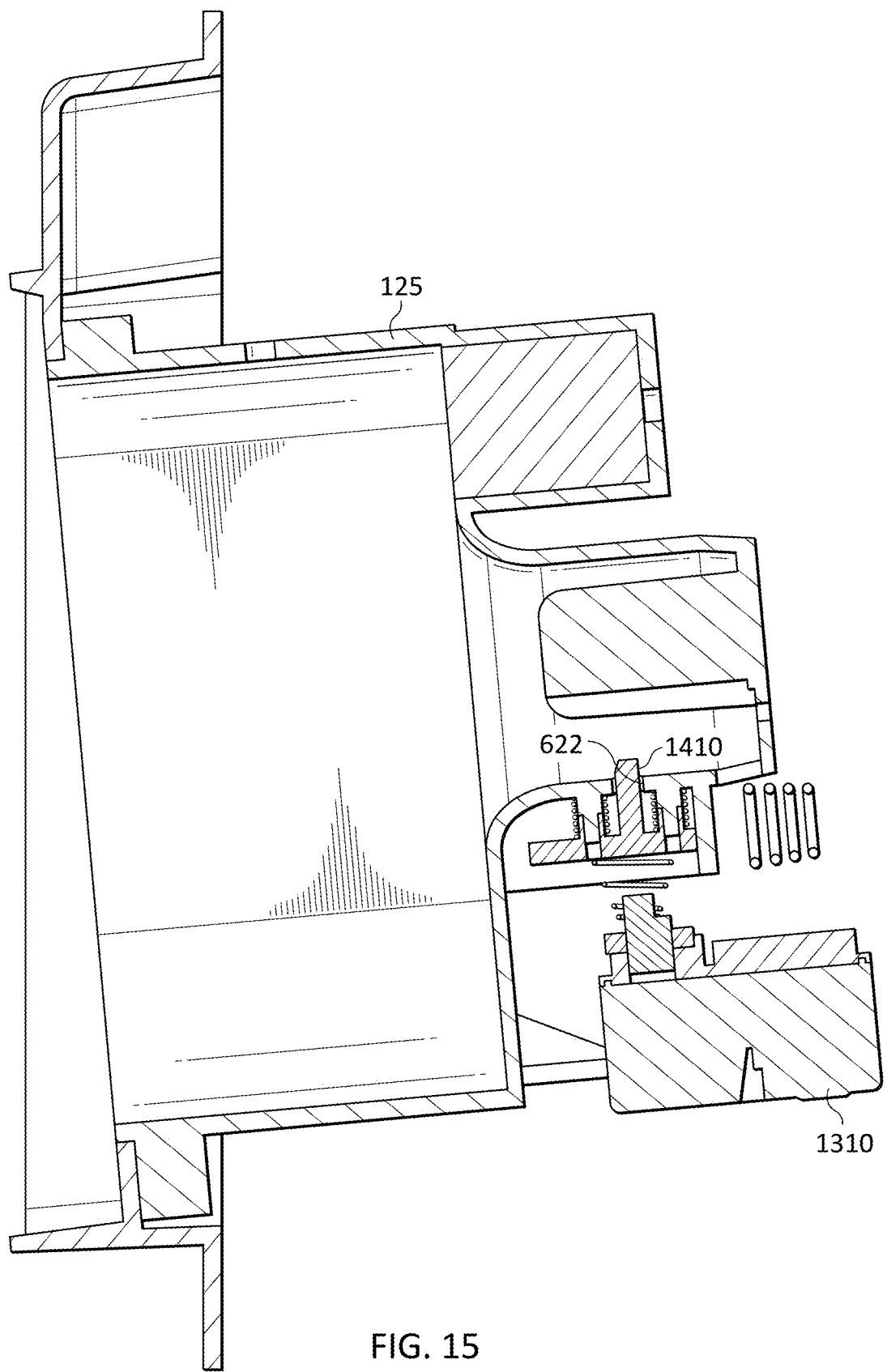
FIG. 15 shows a cross-section view of the side view of FIG. 13 when the latch is in a locked position.
Figure 16:
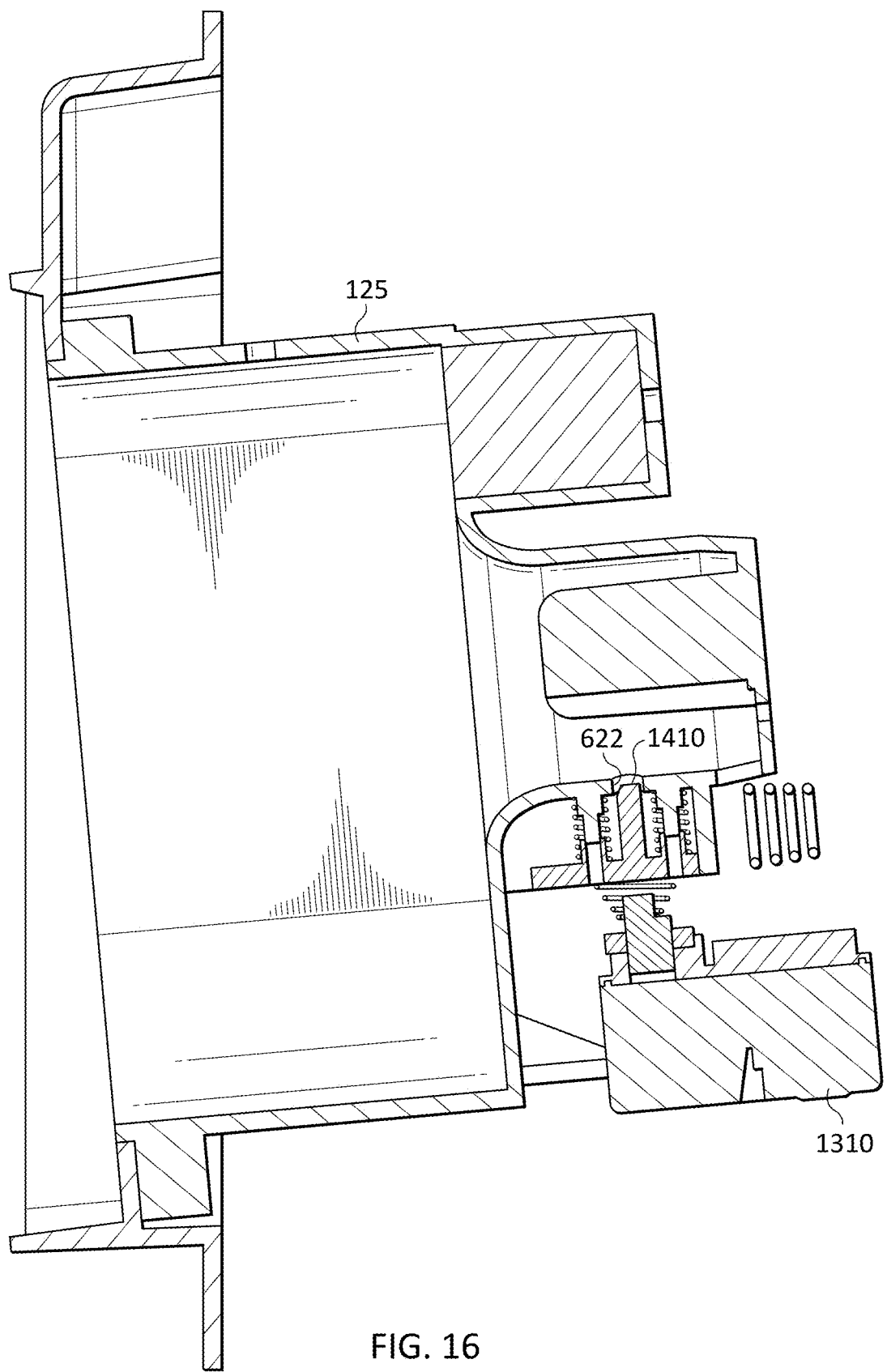
FIG. 16 shows a cross-section view of the side view of FIG. 13 when the latch is in an unlocked position.

FIG. 15 shows a cross-section view of the side view of FIG. 13 when the latch 1410 is in a locked position and FIG. 16 shows a cross-section view of the side view of FIG. 13 when the latch 1410 is in an unlocked position. As shown in FIG. 15, the latch 1410 extends within the cutout 622. This prevents the adapter 120 from being removed from the holster 125. As shown in FIG. 16, the latch 1410 does not extend to the cutout 622. This allows the adapter 120 to be removed from the holster 125.

Figure 17:
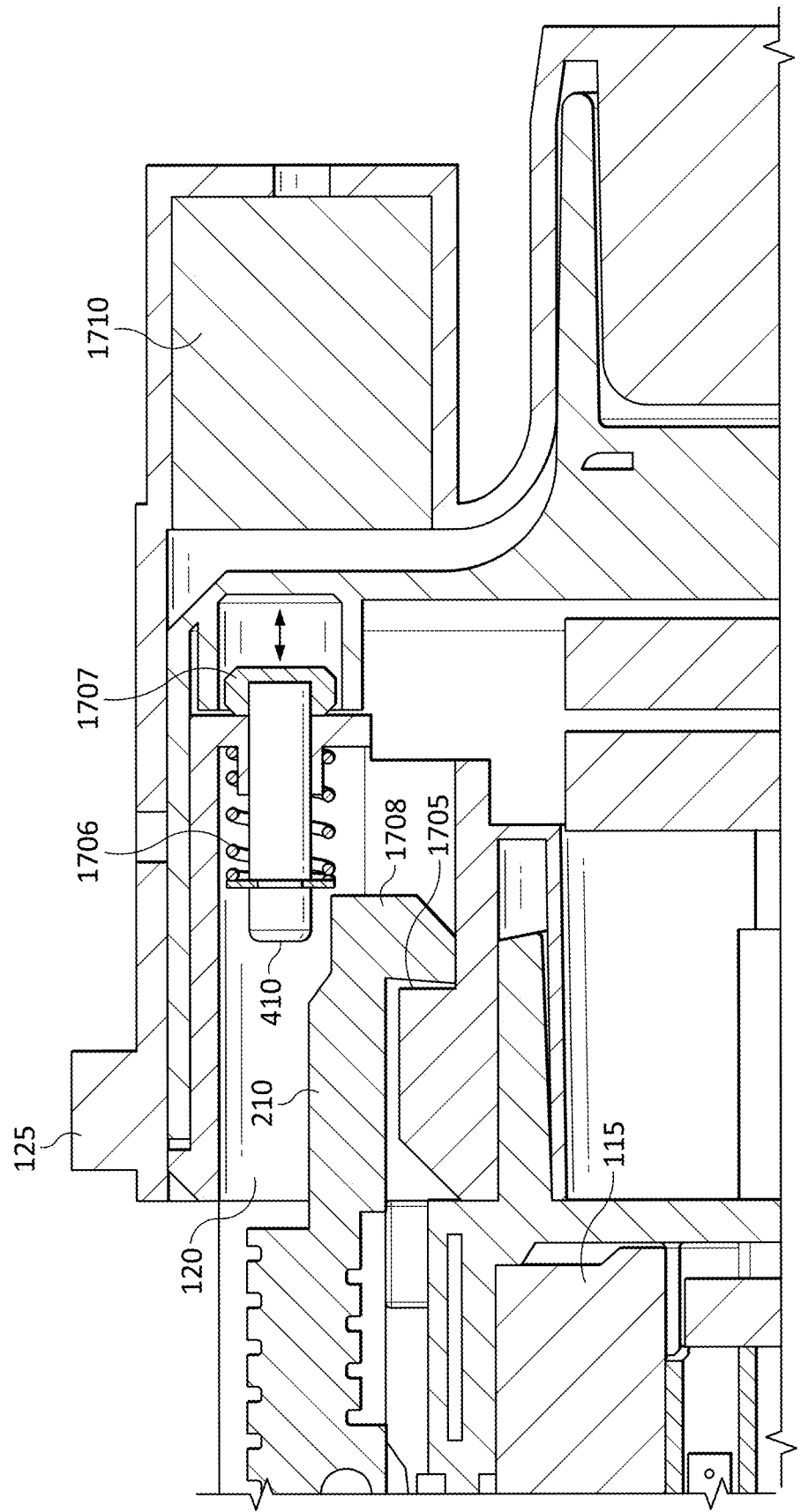
FIG. 17 illustrates a portion of a cross-section of the connector, adapter, and holster that shows the locking control using a locking pin contained within the adapter controlled by the electromagnet that is external to the adapter, according to an embodiment.

The EVSE 110 also locks and unlocks the adapter 120 to and from the connector 115. In an embodiment, the EVSE 110 controls the locking and unlocking of the adapter to and from the connector using a locking pin contained within the adapter controlled by an electromagnet that is external to the adapter. FIG. 17 illustrates a portion of a cross-section of the connector 115, adapter 120, and holster 125 that shows the locking control using a locking pin 410 contained within the adapter 120 controlled by the electromagnet 1710 that is external to the adapter 120. The electromagnet 1710 is part of the holster 125. The locking pin 410 is attached to a locking pin plunger 1707. The locking pin plunger 1707 and the locking pin 410 are contained within the adapter 120.

The locking pin 410 is spring loaded to the locked position (where the latch 210 of the connector 115 is prevented from being removed from the notch 1705 of the adapter 120). The connector 115 is locked to the adapter 120 when inserted into the adapter 120. When inserted, the latch 210 pushes against the locking pin 410 causing the compression spring 1706 to compress until the hook portion 1708 of the latch 210 snaps down to the notch 1705 and clearing the locking pin 410. The compression spring 1706 then decompresses causing the locking pin 410 to move back to the locked position.

The electromagnet 1710 controls the movement of the locking pin plunger 1707 and thus the locking pin 410. For example, when activated, the electromagnet 1710 pulls back the locking pin plunger 1707 overcoming the spring force of the spring 1706 that causes the locking pin 410 to be put in an unlocked position where the connector 115 can be removed from the adapter 120. For example, the user can compress the button 105 to lift the hook portion 1708 of the latch 210 out of the notch 1705 and remove the connector 115 from the adapter 120.

Figure 18:
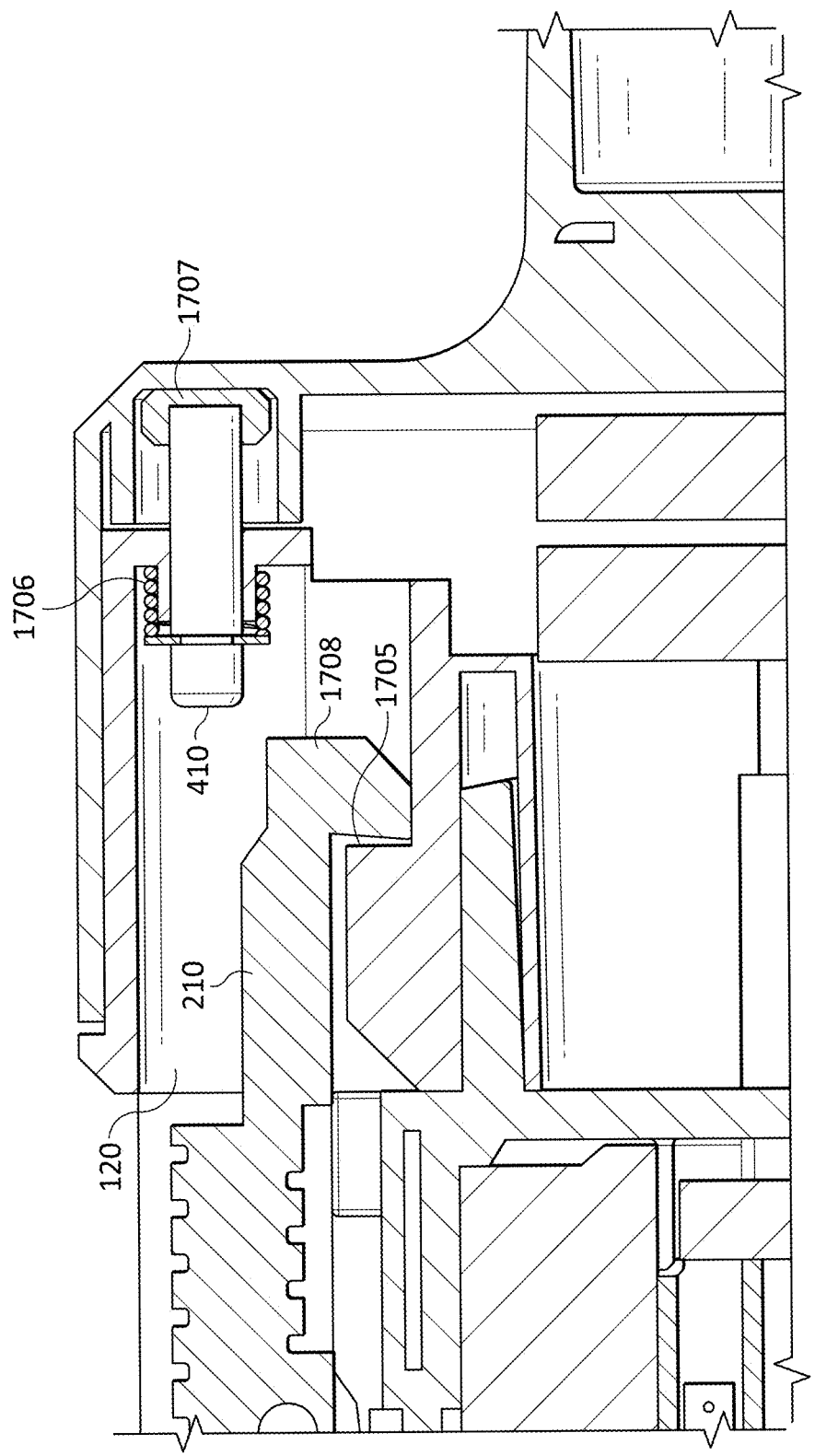
FIG. 18 shows the locking pin plunger shown in FIG. 17 pulled back by the electromagnet thereby putting the locking pin in an unlocked position.
Figure 19:
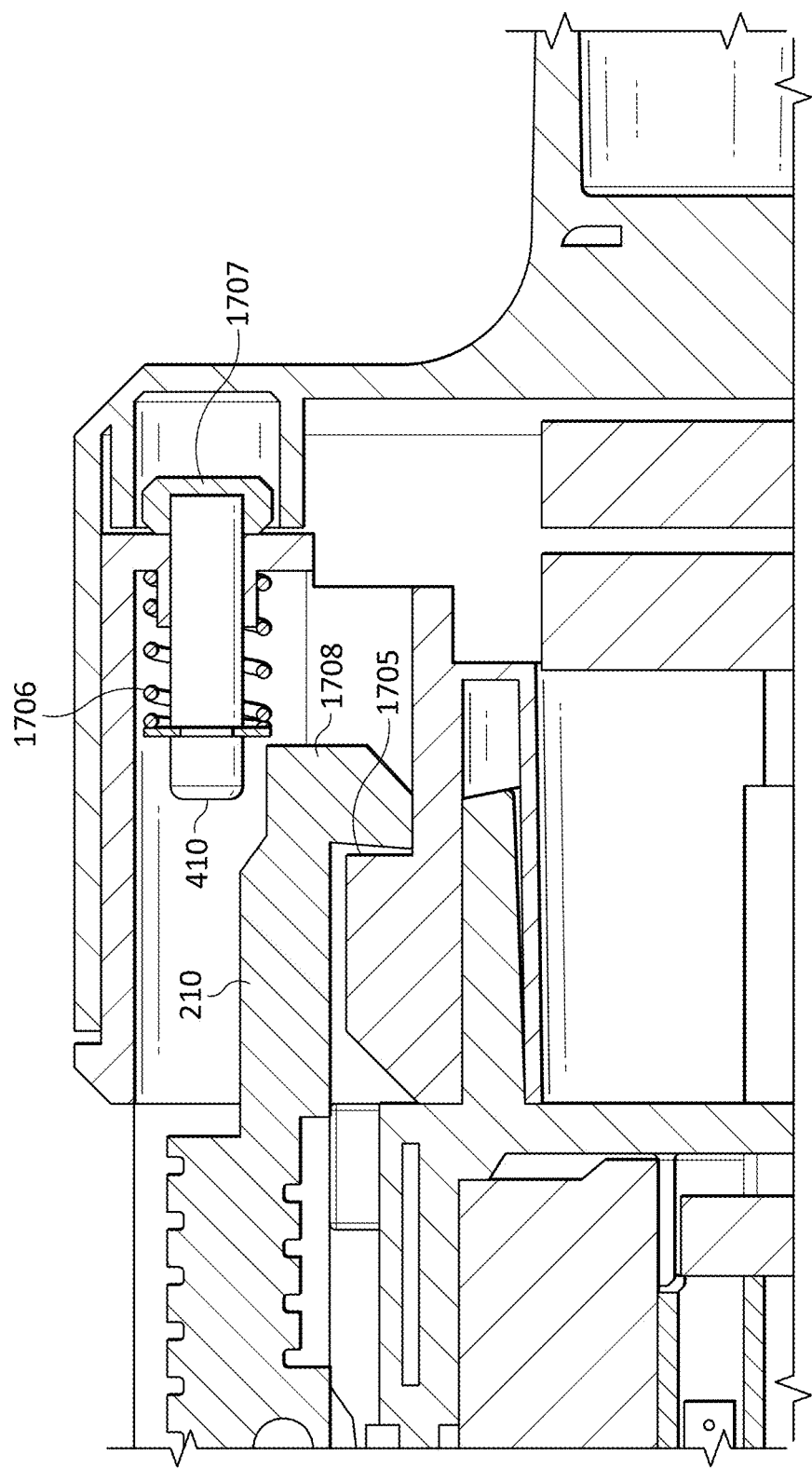
FIG. 19 shows the locking pin plunger shown in FIG. 17 in a locking position thereby putting the locking pin in a locked position.

FIG. 18 shows the locking pin plunger 1707 pulled back by the electromagnet 1710 (the electromagnet 1710 is not shown in FIGS. 18 and 19) thereby putting the locking pin 410 in an unlocked position where the latch 210 of the connector 115 can be removed from the adapter 120. FIG. 19 shows the locking pin plunger 1707 in a locking position (not pulled back by the electromagnet 1710) thereby putting the locking pin 410 in a locked position where the latch 210 of the connector 115 cannot be removed from the adapter 120. The embodiment shown in FIGS. 17-19 can be fully sealed with no holes for mechanical mechanisms or electrical signal points.

Figure 20:
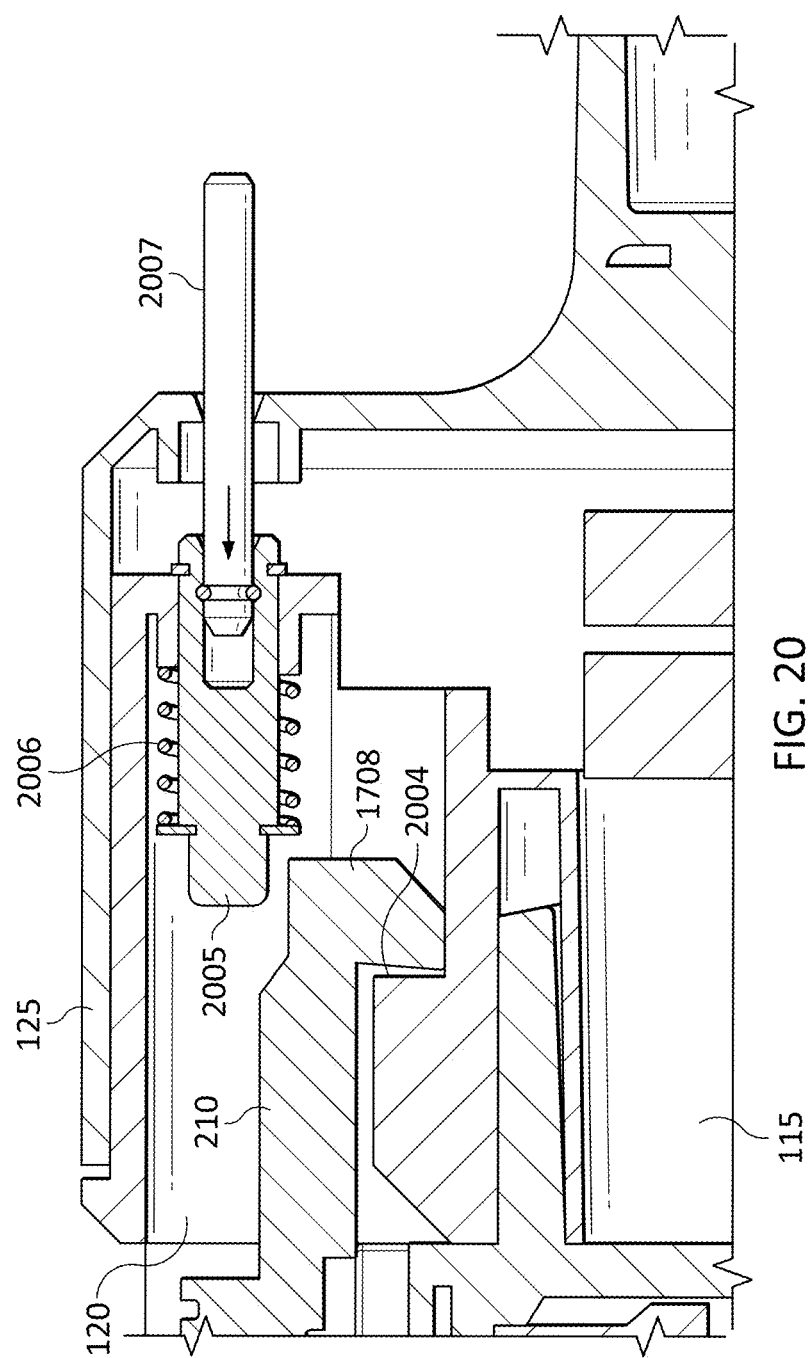
FIG. 20 shows a cross-section view of the connector, the adapter, and the holster according to an embodiment.
Figure 21:
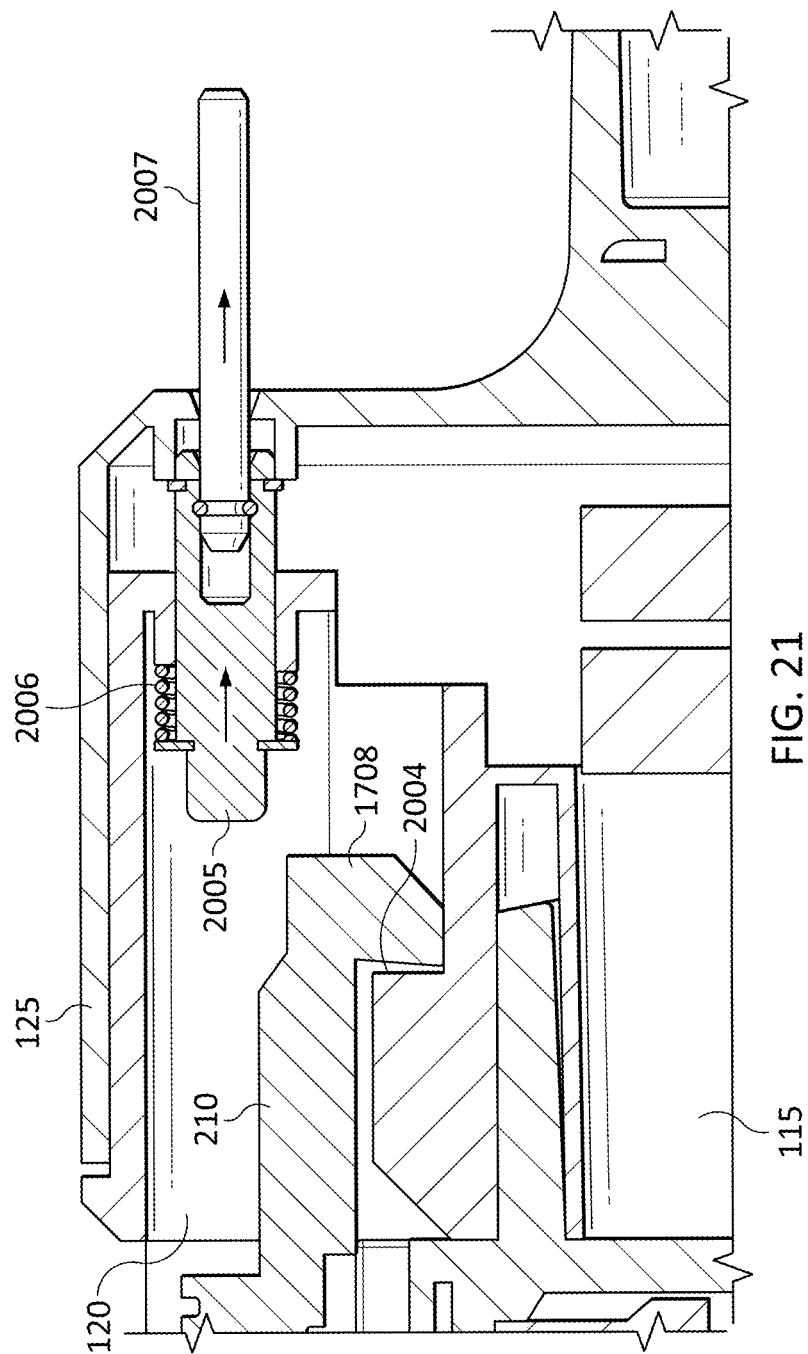
FIG. 21 shows the cross-section view of FIG. 20 where the ball-lock quick release pin engages the adapter locking pin and overcomes the spring force of the compression spring to move the adapter locking pin to an unlocked position.
Figure 22:
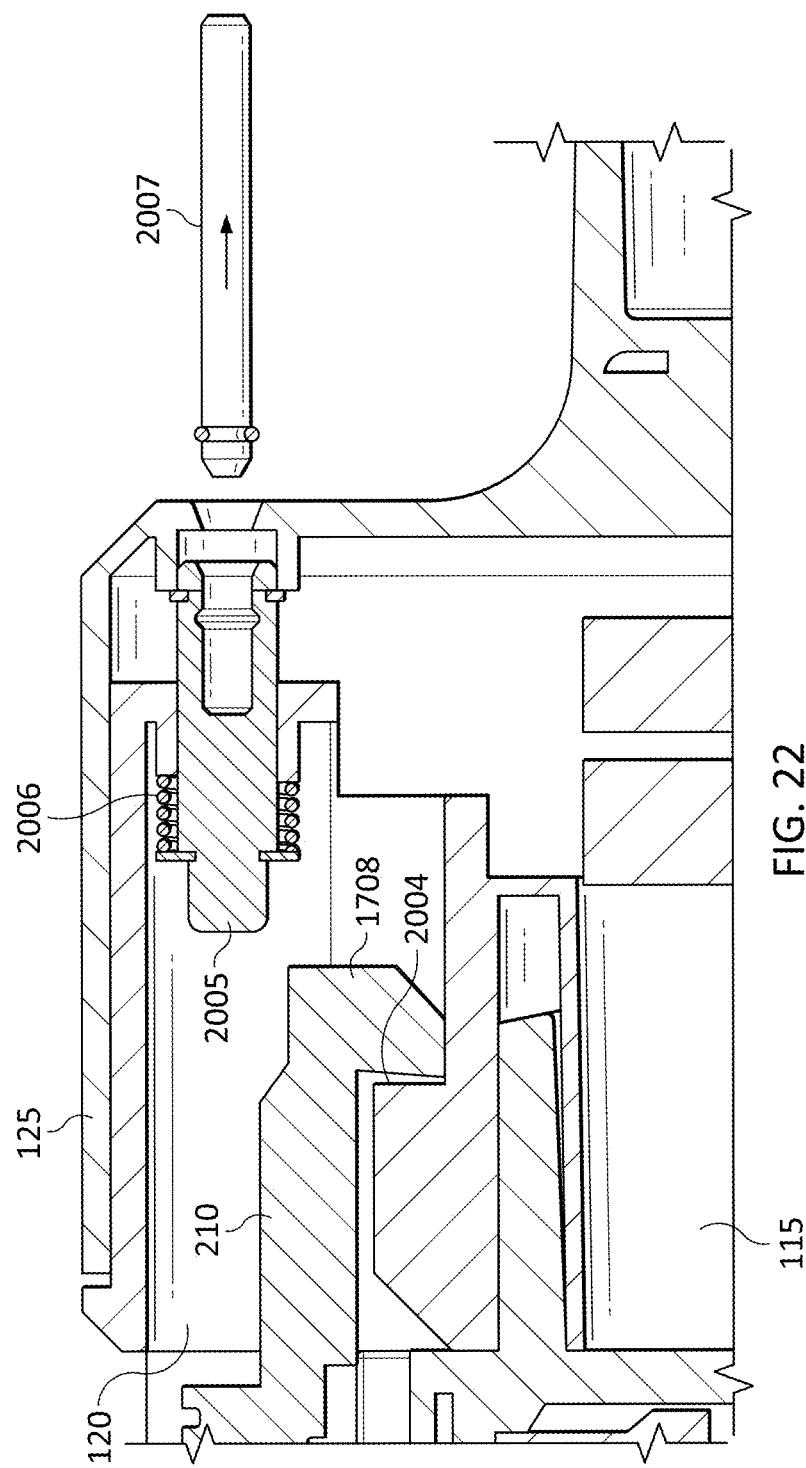
FIG. 22 shows the cross-section view of FIG. 20 where once a hard stop is hit, the ball-lock quick release disengages from the adapter locking pin.
Figure 23:
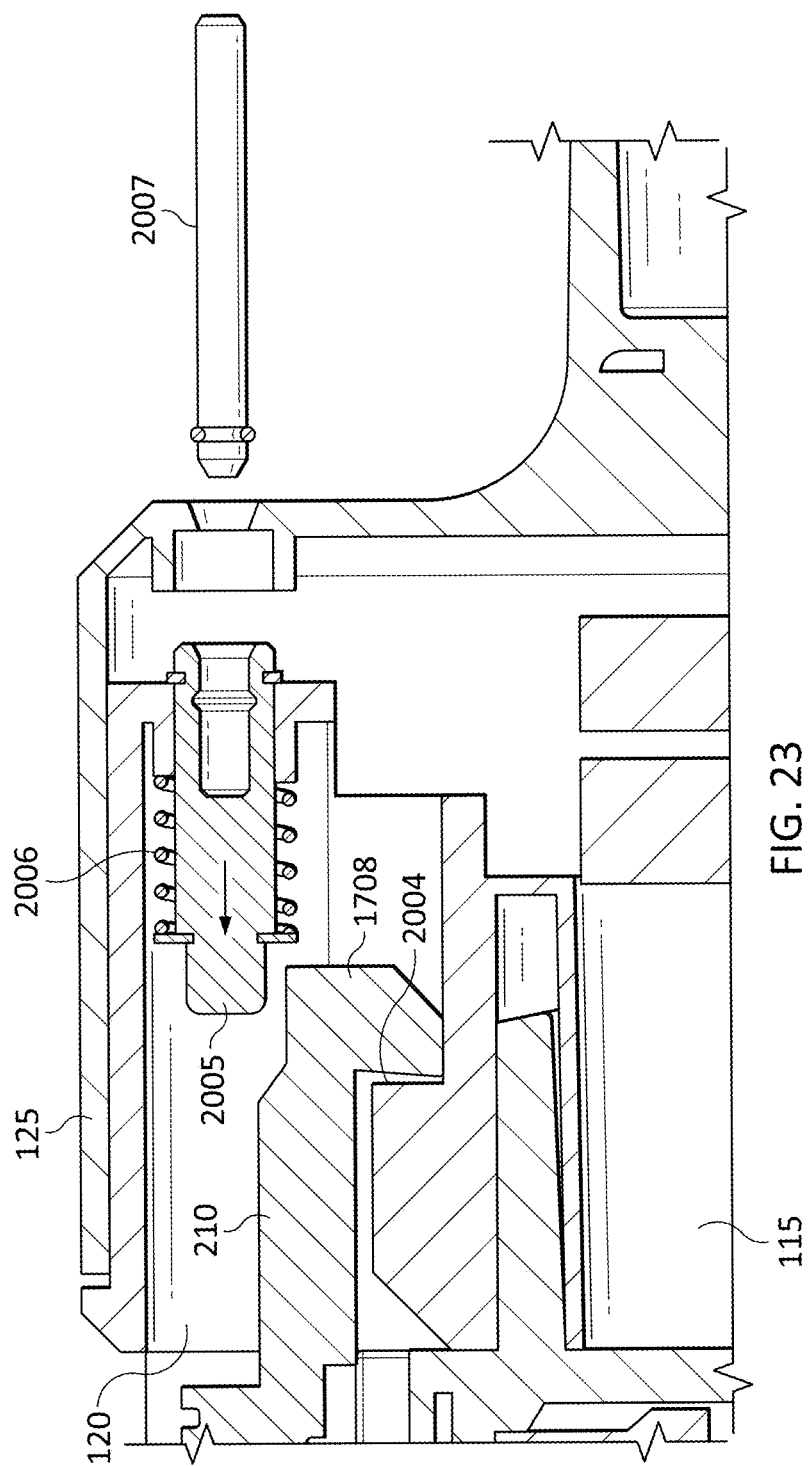
FIG. 23 shows the cross-section view of FIG. 20 where after disengaging, the compression spring returns the adapter locking pin to a locked position.

In another embodiment, the EVSE 110 locks and unlocks the adapter 120 to and from the connector 115 using an adapter locking pin contained with the adapter with an undercut slot for a ball-lock quick release. FIGS. 20-23 show such an exemplary embodiment. FIG. 20 shows a cross-section view of the connector 115, the adapter 120, and the holster 125 according to an embodiment. The adapter locking pin 2005 is spring loaded to the locked position. The connector 115 is locked to the adapter 120 when inserted into the adapter 120. When inserted, the latch 210 pushes against the adapter locking pin 2005 causing the compression spring 2006 to compress until the hook portion 1708 of the latch 210 snaps down to the notch 2004 and clearing the adapter locking pin 2005. The compression spring 2006 then decompresses causing the adapter locking pin 410 to move back to the locked position. The holster 125 includes a ball-lock quick release pin 2007 that is linear actuated. As shown in FIG. 20, the ball-lock quick release pin 2007 is inserted via a linear actuator (the linear actuator is not shown in FIG. 20). FIG. 21 shows the cross-section view of FIG. 20 where the ball-lock quick release pin 2007 engages the adapter locking pin 2005 and overcomes the spring force of the compression spring 2006 to move the adapter locking pin 2005 to an unlocked position thereby allowing the connector 115 to be removed from the adapter 120. FIG. 22 shows the cross-section view of FIG. 20 where once a hard stop is hit, the ball-lock quick release pin 2007 disengages from the adapter locking pin 2005. After disengaging, the adapter locking pin 2005 springs back to the locked position. FIG. 23 shows the cross-section view of FIG. 20 where after disengaging, the compression spring 2006 returns the adapter locking pin 2005 to a locked position. The embodiment shown in FIGS. 20-23 requires a specific unlocking pin with ball-locks to defeat the adapter locking mechanism.

In another embodiment, the EVSE 110 locks and unlocks the adapter 120 to and from the connector 115 using a latch with an attached magnet that is controlled by a magnet that is external to the adapter 120. FIGS. 24-29 show such an exemplary embodiment. In such an embodiment, the connector 115 can be inserted into the adapter 120 even if the adapter 120 is locked to the holster 125. Further, the connector latch can be actuated even if the connector 115 is locked to the adapter 120. In an embodiment, the actuation of the connector latch may trigger the termination of the charging session and/or be used to trigger the unlocking and/or opening of the charging port door of an electric vehicle.

Figure 24:
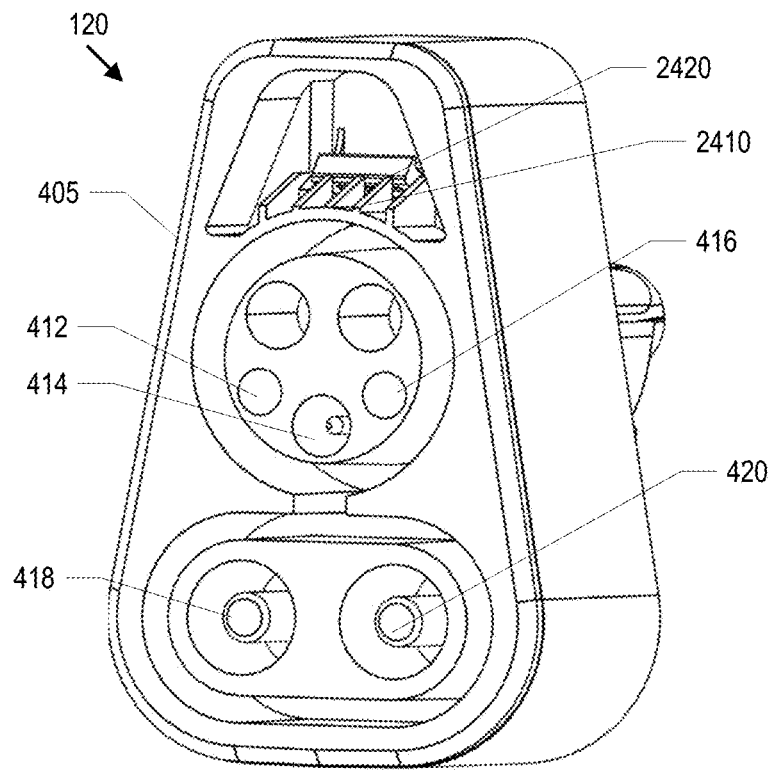
FIG. 24 shows a perspective view of the first side of the adapter according to an embodiment where the adapter is locked and unlocked from the connector using a latch with an attached magnet.
Figure 25:
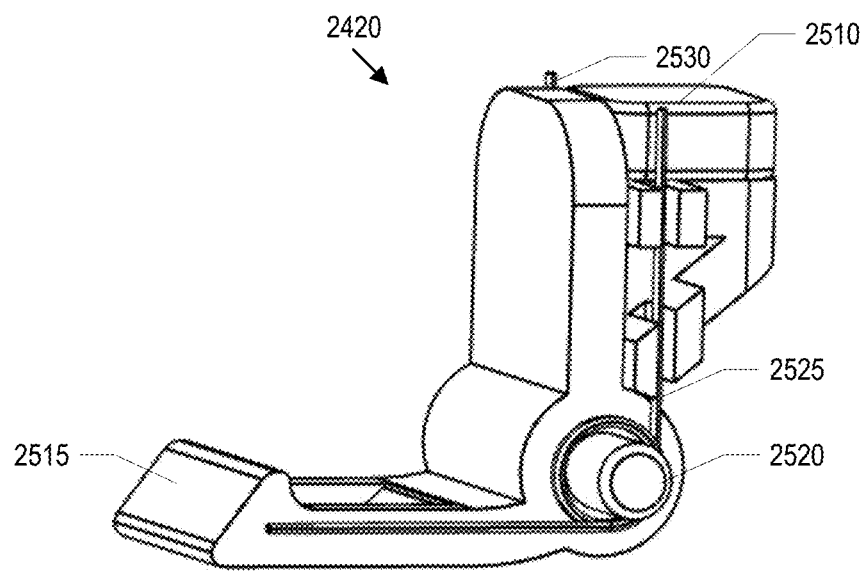
FIG. 25 shows an exemplary latch according to an embodiment of FIG. 24.

FIG. 24 shows a perspective view of the first side of the adapter 120 according to an embodiment where the adapter 120 is locked and unlocked from the connector 115 using a latch with an attached magnet or magnetic coil. In this embodiment, the adapter 120 includes a sloping surface 2410 and a latch 2420. FIG. 25 shows an exemplary latch 2420 according to an embodiment. The latch 2420 includes the internal magnet 2510. The internal magnet 2510 can interact with another magnet or magnetic coil that is external to the adapter 120 (e.g., shown in FIG. 27). The latch 2420 includes a hook end 2515 that can hook on the hook portion of the latch of the connector 115. The latch 2420 includes the torsion springs 2525 and 2530 that wrap around the pin 2520 to follow the latch of the connector 115 unless the magnetic force from the external magnet or magnetic coil is present.

Figure 26:
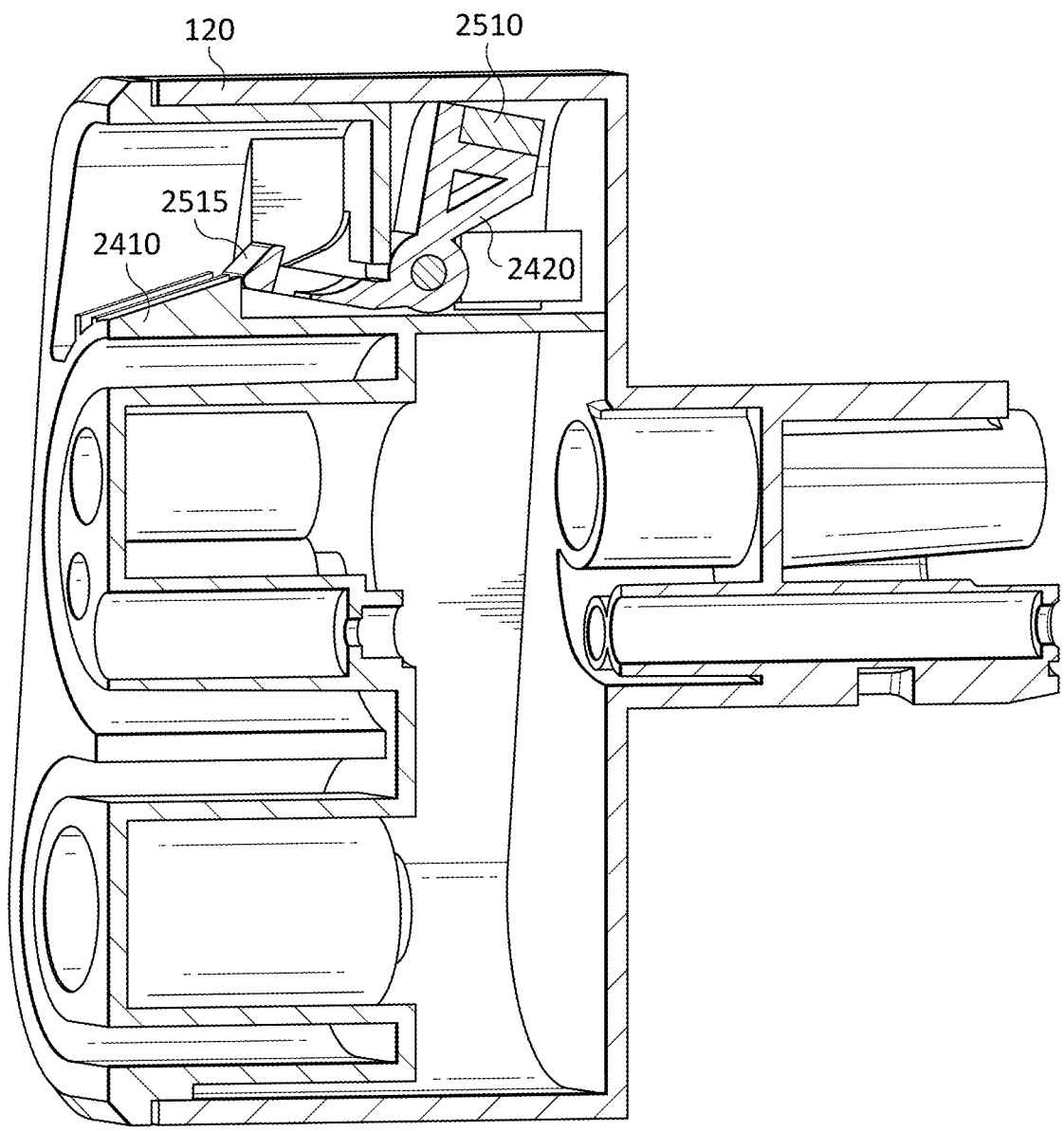
FIG. 26 shows a cross-section view of the adapter of FIG. 24 according to an embodiment.
Figure 27:
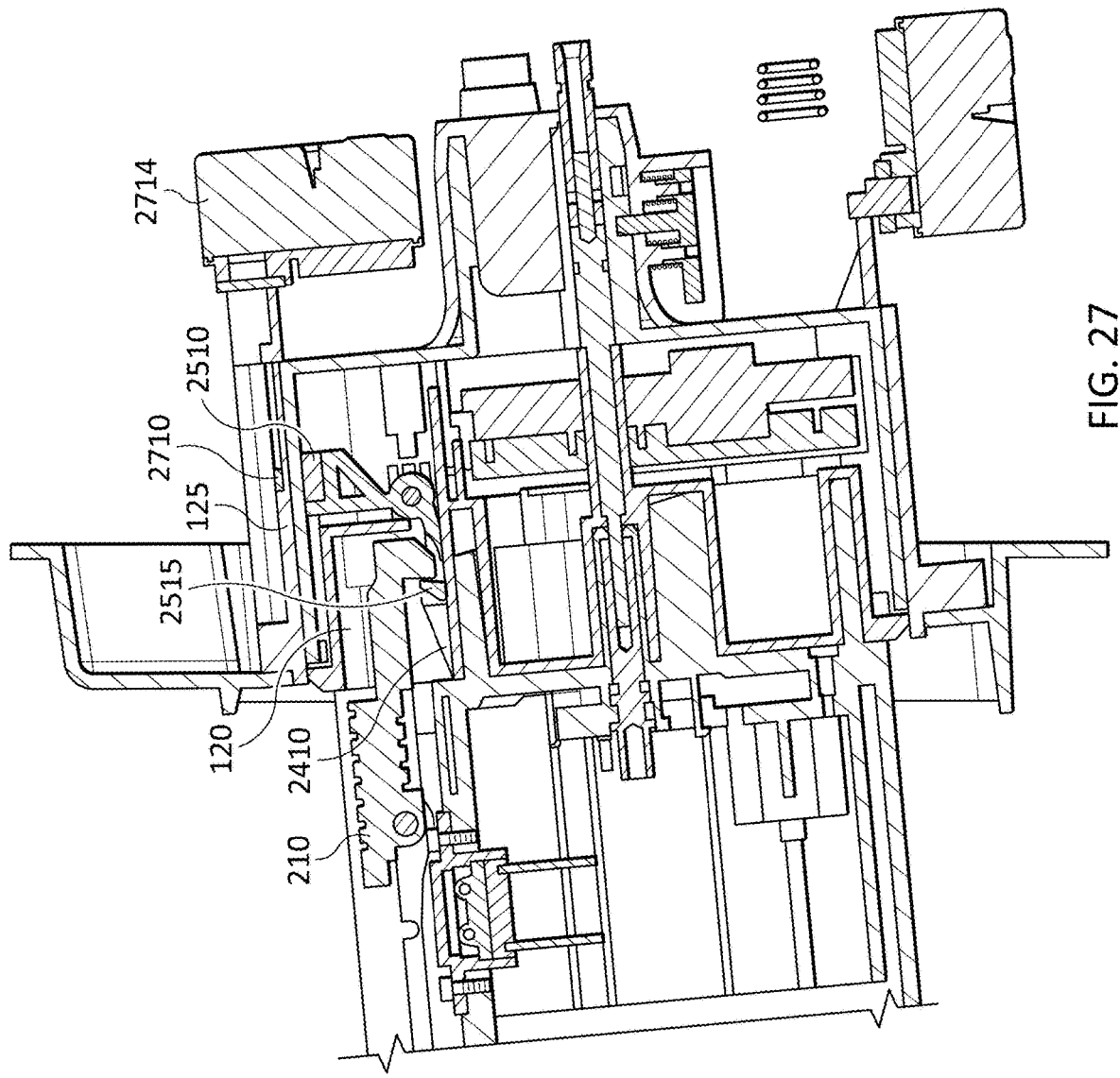
FIG. 27 shows a cross-section view of the connector, adapter, and the holster that shows the locking control using a latch with an attached magnet according to an embodiment.
Figure 28:
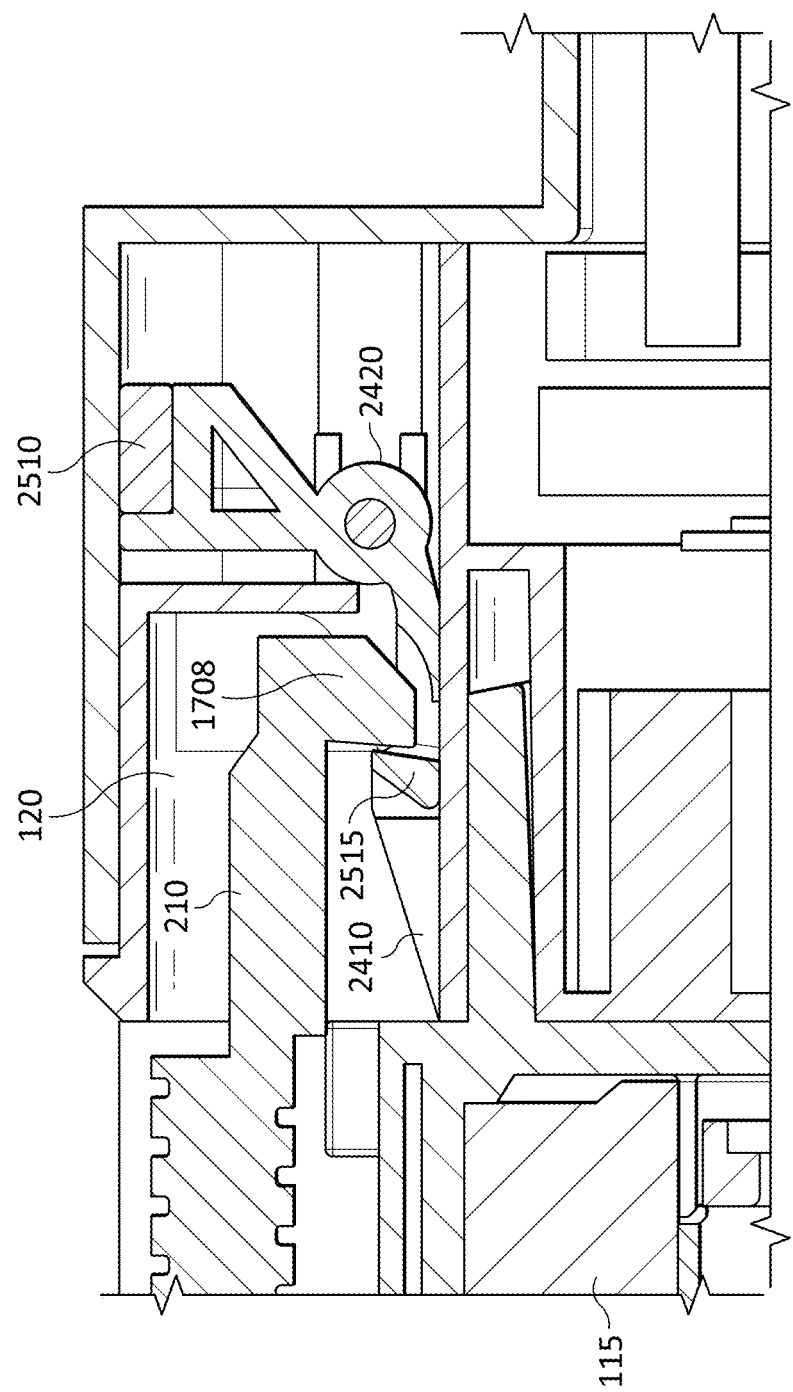
FIG. 28 shows the latch in an unlocked position thereby allowing the connector to be removed from the adapter according to an embodiment.

FIG. 26 shows a cross-section view of the adapter 120 of FIG. 24 according to an embodiment. FIG. 27 shows a cross-section view of the connector 115, adapter 120, and the holster 125 that shows the locking control using a latch with an attached magnet. Although FIG. 27 shows an attached magnet, a magnetic coil may also be used. In the embodiment shown in FIG. 27, the holster 125 includes an external magnet 2710 that slides via a linearly actuated motor 2714. For example, when the connector 115 is not locked to the adapter 120, the linear actuated motor 2714 causes the external magnet 2710 to be in a position such that the magnetic force attracts the internal magnet 2510. In this unlocked position, the latch 2420 is prevented from hooking to the hook portion 1708 of the latch 210 of the connector 115. This allows the removal of the connector 115 from the adapter 120. For example, the user can compress the button 105 to lift the hook portion 1708 of the latch 210 and the magnetic force from the external magnet 2710 that is applied to the internal magnet 2510 prevents the latch 2420 from traveling with the latch 210. FIG. 28 shows the latch 2420 in an unlocked position thereby allowing the connector 115 to be removed from the adapter 120. In FIG. 28, the external magnet 2710 (which is not shown in FIGS. 28 and 29) is in a position that attracts the internal magnet 2510 thereby preventing the latch 2420 from hooking to the hook portion 1708 of the latch 210 of the connector 115.

Figure 29:
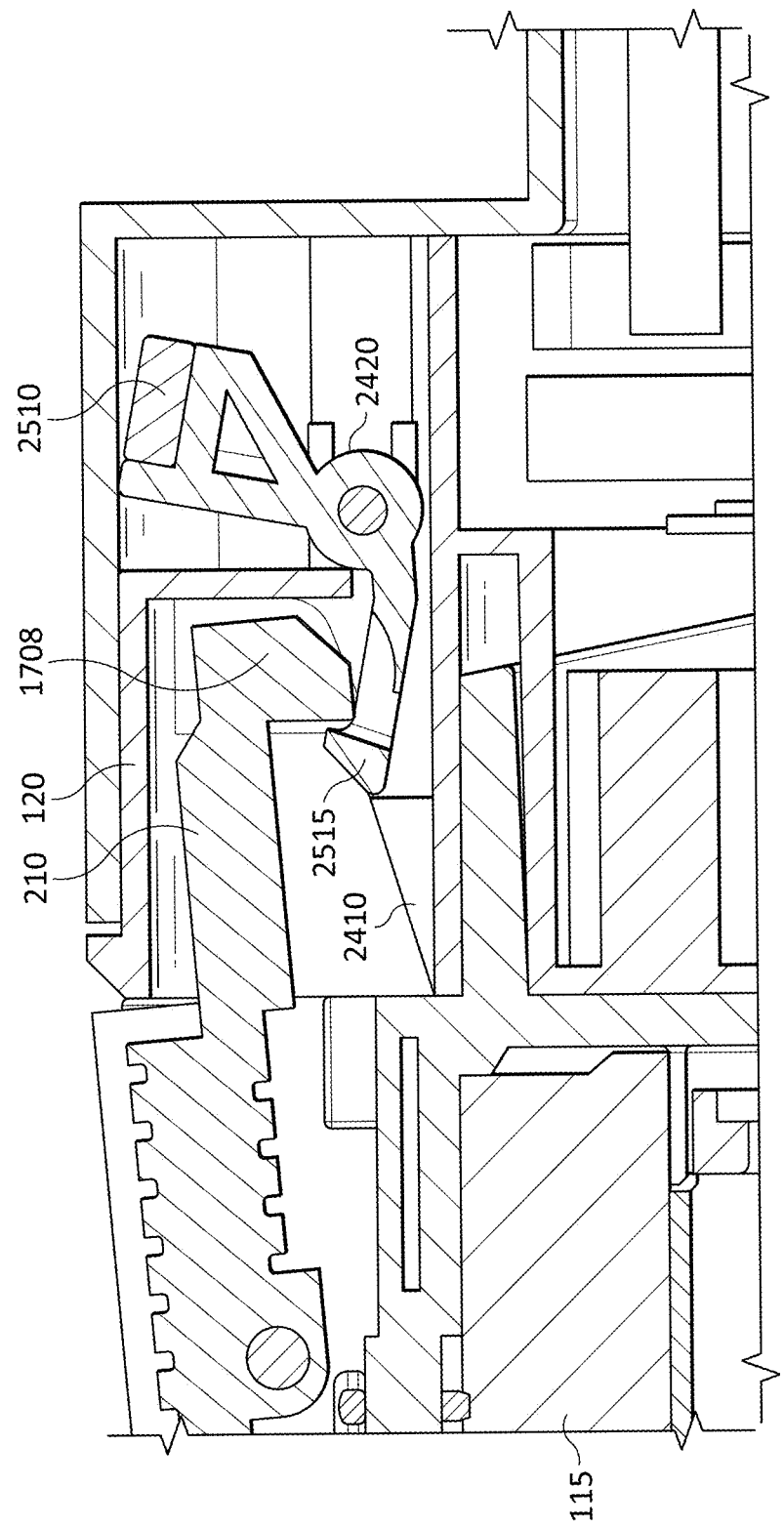
FIG. 29 shows the latch in a locked position (the magnetic force from the magnet is not present) thereby locking the connector to the adapter according to an embodiment.

When the connector 115 is locked to the adapter 120, the linear actuated motor 2714 causes the external magnet 2710 to be in a position such that the magnetic force does not attract the internal magnet 2510. In this locked position, the hook end 2515 of the latch 2420 hooks on the hook portion 1708 of the latch 210 such that the connector 115 is locked to the adapter 120. For example, the user compresses the button 105 to lift the hook portion 1708 of the latch 210 and since the magnetic force from the external magnet 2710 is not present, latch 2420 travels with the latch 210. FIG. 29 shows the latch 2420 in a locked position (the magnetic force from the magnet 2710 is not present) thereby locking the connector 115 to the adapter 120.

The embodiment shown in FIGS. 24-29 can be fully sealed with no holes for mechanical mechanisms or electrical signal points.

Although FIGS. 24-29 describe an attached magnet (the internal magnet 2510), the attached magnet may be replaced with a ferromagnetic metal. In such a case, the external magnet 2710 provides a stronger magnetic force to attract and hold the latch 2420.

The embodiment shown in FIGS. 24-29 allows the latch 210 to operate (move up and down) when the connector 115 is inserted into the adapter 120. The EVSE 110 may detect when the latch button 105 is pressed and take one or more actions. The one or more actions can be different based on the state of the adapter 120 when the latch button 105 is pressed, the duration of the press of the latch button 105, and/or the frequency within a period in which the latch button 105 is pressed.

As an example, the EVSE 110 may detect that the latch button 105 is pressed when the connector 115 is attached to the adapter 120, the pair is removed from the holster 125, and the adapter 120 is not connected to an electric vehicle. Responsive detecting this condition, the EVSE 110 can take an action including transmitting an RF signal to unlock and/or open a charging port door of an electric vehicle inlet. In such an example, the latch button 105 is being used for an unconventional purpose (the triggering of an RF signal to unlock and/or open a charging port door).

As another example, the EVSE 110 may detect that the latch button 105 is pressed when the connector 115 is attached to the adapter 120 and the adapter 120 is connected to an electric vehicle. Responsive to detecting this condition, the EVSE 110 can take an action including terminating a charging session. In such an example, the latch button 105 is being used for an unconventional purpose (the termination of the charging session).

As another example, the EVSE 110 may detect that the latch button 105 is pressed when the connector 115 is attached to the adapter 120 that is itself in the holster 125. In such a situation, the EVSE 110 may perform an action for unlocking the adapter 120 from the holster 125, and/or an action for unlocking the connector 115 from the adapter 120, which may depend on a duration of the press of the latch button 105 and/or the frequency within a period in which the latch button 105 is pressed. As an example, the EVSE 110 may be configured to unlock the adapter 120 from the holster 125 if the EVSE 110 detects the latch button 105 is pressed down greater than a period (e.g., a 'long' press). As another example, the EVSE 110 may be configured to unlock the connector 115 from the adapter 120 responsive to detecting that the latch button 105 is pressed a number of times in succession during a period (e.g., double pressing).

Figure 30A:
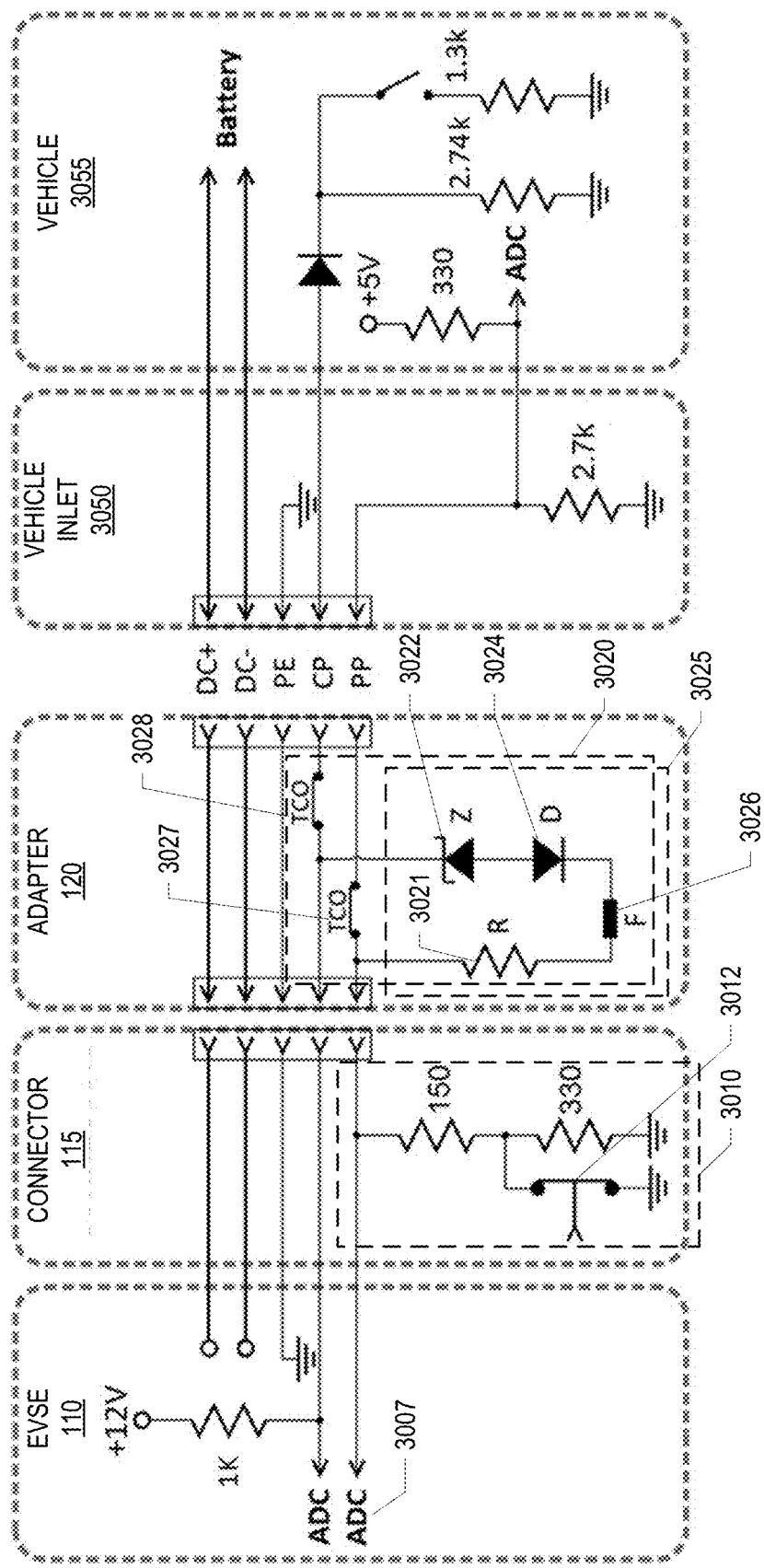
FIG. 30A shows an exemplary circuit schematic according to an embodiment.

In the embodiment shown in FIGS. 24-29, the adapter 120 may include a circuit that is used by the EVSE 110 when detecting states of the adapter 120. FIG. 30A shows an exemplary circuit schematic of such a circuit according to an embodiment. The voltage of the proximity signal is measured at the ADC 3007. The connector 115 includes a proximity detection circuit 3010. The switch 3012 is mechanically linked to the latch of the connector 115. The switch 3012 is normally closed except when the latch is actuated. The adapter 120 includes a circuit 3020 that includes a Zener diode 3022, Schottky diode 3024, and a resistor 3021 in series between the pilot pin and the proximity pin. Although the exemplary circuit shows a single Zener diode, there may be multiple Zener diodes in series (e.g., two Zener diodes in series). For example, one Zener diode may have a positive temperature coefficient and the other Zener diode may have a negative temperature coefficient that cancel out to provide a stable voltage drop over a wide range of temperatures. The Schottky diode 3024 blocks current from the proximity line to the control pilot line. The ferrite bead 3026 is used to filter all high-frequency current that may pass through the Zener diode 3022 and the Schottky diode 3024. The ferrite bead 3026 is optional in an embodiment. The circuit 3020 also includes the thermal cutoff (TCO) 3027 on the proximity pilot line and the TCO 3028 on the control pilot line. Although FIG. 30A shows a TCO on the proximity pilot line and the control pilot line, in an embodiment the thermal cutout could be only on the proximity pilot line or only on the control pilot line. Further, the circuit 3020 can include a resister in parallel to the TCO 3027 on the proximity pilot line for derating the charger. In such a case, if the TCO 3027 opens, the resistor would change the proximity voltage and the EVSE and the electric vehicle can translate that to an over temperature event. The vehicle inlet 3050 and the vehicle 3055 include circuits for proximity detection (which are not changed in embodiments described herein). Apart of the circuit 3020 is represented by the group 3025, which includes the resistor 3021, the Zener diode 3022, the Schottky diode 3024, and the ferrite bead 3026.

Figure 30B:
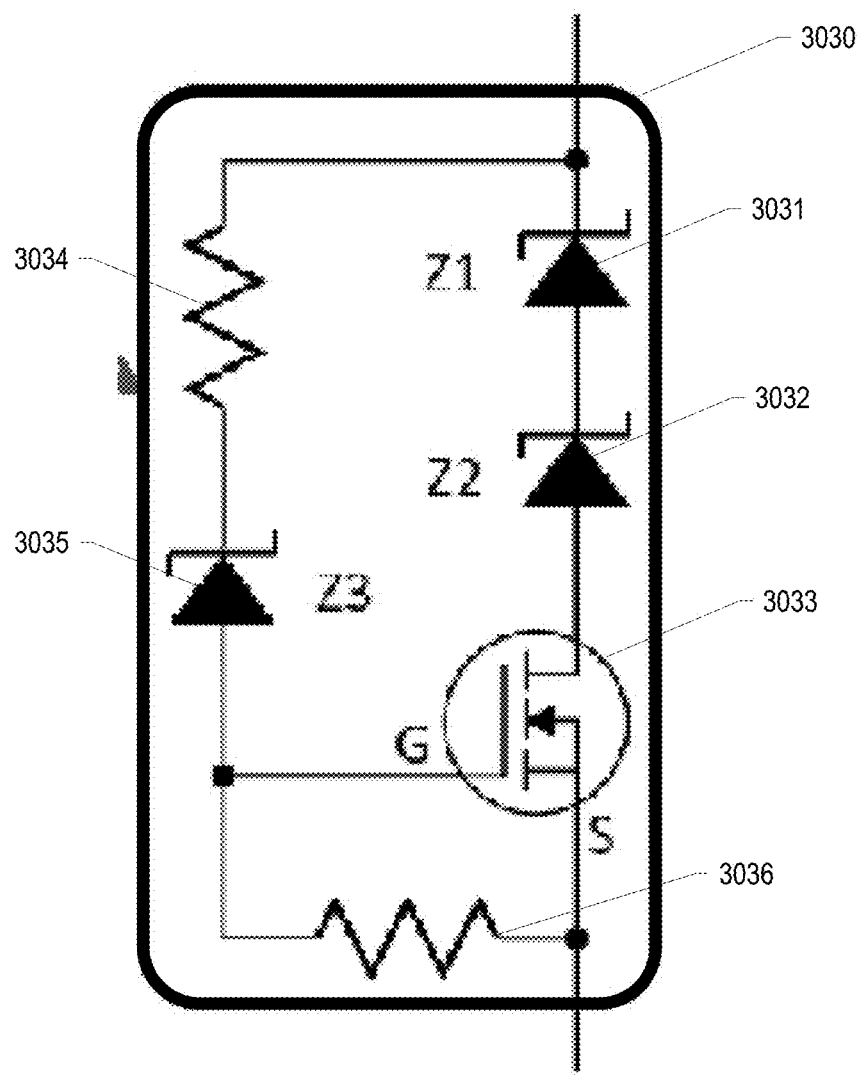
FIG. 30B shows a circuit that replaces a Zener diode of the exemplary circuit of FIG. 30A according to an embodiment.

FIG. 30B shows a circuit that replaces part of the circuit 3020 of FIG. 30A according to an embodiment. In particular, the group 3025 of FIG. 30A is replaced with the circuit 3030 shown in FIG. 30B. The rest of the circuitry shown in FIG. 30A remains. The circuit shown in FIG. 30B may protect against a failure of the Zener diode 3022 of FIG. 30A to prevent safety risks. The circuit 3030 includes the Zener diodes 3031 and 3032 with positive and negative thermal coefficients to compensate for thermal voltage drift. However, the Zener diodes 3031 and 3032 could be replaced with one Zener diode. The Zener diode 3035 and gate to source voltage of the MOSFET 3033 are selected such that the sum of voltage drops on the Zener diode 3035 and the Vgs threshold is slightly less than the voltage drops on the Zener diodes 3031 and 3032. Thus, in normal conditions, the MOSFET 3033 is on and the circuit 3030 acts the same as the circuit shown in FIG. 30A. However, if the Zener diodes 3031 and/or 3032 fail, the voltage on the gate to source voltage decreases below the threshold voltage and the MOSFET 3033 goes into saturation region. In this case, the voltage drop on the MOSFET drain source is almost equal to the failed (shorted) Zener diode(s) and the system will continue to work as expected. The voltage drop is never less than the sum of voltage drops on the Zener diode 3035 and the Vgs threshold of the MOSFET 3033. The resistor 3036 discharges the gate-source capacitor of the MOSFET 3033 when the failure of the Zener diodes 3031 and/or 3032 occurs. The resistor 3034, which is optional, limits the gate current.

The EVSE 110 can detect whether the connector 115 is connected to the adapter 120 and the adapter 120 is not connected to an electric vehicle based on the voltage of the control pilot signal (e.g., greater than 10 volts and lower than 11 volts). If the connector 115 is attached to the adapter 120 and the adapter 120 is plugged into an EV, the voltage of the control pilot signal drops (e.g., less than 10 volts) which causes the Zener diode 3022 and the Schottky diode 3024 to turn off. If the connector 115 is attached to the adapter 120 and the adapter 120 is not connected to an EV, the EVSE 110 can detect when the latch of the connector 115 is actuated by detecting a raise in the voltage of the proximity signal (e.g., raise from 0.25 volts to 0.7 volts). In an embodiment, responsive to detecting the latch of the connector 115 is actuated when the connector 115 is attached to the adapter 120, removed from the holster, and not connected to the EV, the EVSE 110 causes an RF signal to be transmitted to unlock and/or open a charging port door of the vehicle inlet. The RF transmitter may be included in a circuit of the EVSE 110. The RF transmitter may also be included in a circuit in the connector 115 or the adapter 120.

The determination of the states includes reading the voltages of the pilot signal and the proximity signal and may include reading a presence sensor (e.g., a magnetic field sensor). FIG. 31 is a table that shows exemplary states according to an embodiment. The state 1A has the connector 115 attached to the adapter 120 and plugged into the holster 125, and the latch button 105 of the connector 115 not pressed. The EVSE 110 may determine state 1A when the voltage of the pilot signal is greater than 10 volts and lower than 11 volts (e.g., 10.5 volts), the voltage of the proximity signal is between 0.1 volts and 0.5 volts (e.g., 0.25 volts), the presence sensor indicates the adapter is 120 is within the holster inlet of the holster 125. In state 1A, the latch button 105 of the connector 115 is not pressed.

State 1B is where the connector 115 is attached to the adapter 120 and plugged into the holster 125, and the latch button 105 of the connector 115 is pressed. The EVSE 110 may determine state 1B when the voltage of the pilot signal is greater than 10 volts but under 11 volts (e.g., 10.5 volts), the voltage of the proximity signal is between 0.5 volts and 1 volt (e.g., 0.7 volts), and the presence sensor indicates that the adapter 120 is within the holster inlet of the holster 125.

The EVSE 110 may, responsive to determining state 1B, take one or more actions including unlocking the adapter 120 from the holster 125 and/or unlocking the connector 115 from the adapter 120 depending on the duration of the press of the latch button 105 and/or the frequency of presses of the latch button 105 within a period. The EVSE 110 may determine the duration of the press of the latch button 105 by measuring the voltage of the proximity signal over a predefined period. For example, a long press may be determined if the voltage of the proximity signal is between 0.5V to 1V over a predetermined duration. As another example, a short press may be determined if the voltage of the proximity signal raises to between 0.5V to 1V for less than the predetermined duration (e.g., it goes back down to 0.1V to 0.5V). As another example, a double press may be determined if the voltage of the proximity signal raises to between 0.5V to 1V for less than a first predetermined duration (e.g., it goes back down to 0.1V to 0.5V) and the voltage of the proximity signal again raises to between 0.5V to 1V within a predetermined period of the prior detected press. As an example, the EVSE 110 may be configured to unlock the adapter 120 from the holster 125 if the EVSE 110 detects the latch button 105 is pressed down greater than a duration (e.g., a 'long' press). As another example, the EVSE 110 may be configured to unlock the connector 115 from the adapter 120 responsive to detecting that the latch button 105 is pressed a number of times in succession during a period (e.g., double pressing).

State 2A is where the connector 115 is attached to the adapter 120 and the adapter 120 is not within the holster 125, and the latch button 105 of the connector 115 is not pressed. The EVSE 110 may determine state 2A when the voltage of the pilot signal is greater than 10 volts but under 11 volts (e.g., 10.5 volts), the voltage of the proximity signal is between 0.1 volts and 0.5 volts (e.g., 0.25 volts), and the presence sensor indicates that the adapter 120 is not within the holster inlet of the holster 125.

State 2B is where the connector 115 is attached to the adapter 120 and the adapter 120 is not within the holster 125, and the latch button 105 of the connector 115 is pressed. The EVSE 110 may determine state 2B when the voltage of the pilot signal is greater than 10 volts but under 11 volts (e.g., 10.5 volts), the voltage of the proximity signal is between 0.5 volts and 1 volt (e.g., 0.7 volts), and the presence sensor indicates that the adapter 120 is not within the holster inlet of the holster 125. The EVSE 110 may, responsive to determining state 2B, transmit an RF signal to trigger the unlocking and/or opening of a charging port door of an electric vehicle inlet.

State 3 is where the connector 115 is not attached to the adapter 120 and the adapter 120 is plugged into the holster 125. The EVSE 110 may determine state 3 when the voltage of the pilot signal is between 11 volts and 13 volts (e.g., 12 volts), the voltage of the proximity signal is less than 0.1 volts, and the presence sensor indicates the adapter 120 is within the holster inlet of the holster 125.

State 4 is where the connector 115 is not attached to the adapter 120 and the adapter 120 is not plugged into the holster 125 (e.g., the adapter 120 may be lost). The EVSE 110 may determine state 4 when the voltage of the pilot signal is between 11 volts and 13 volts (e.g., 12 volts), the voltage of the proximity signal is less than 0.1 volts, and the presence sensor includes that the adapter 120 is not within the holster inlet of the holster 125.

State 5A is where the connector 115 is attached to the adapter 120 and it is plugged into an electric vehicle. The EVSE 110 may determine state 5A when the voltage of the pilot signal is less than 10 volts and the voltage of the proximity signal is between 1 volt to 2 volts.

State 5B is where the connector 115 is attached to the adapter 120 and it is plugged into an electric vehicle, and the latch button 105 of the connector 115 is pressed. The EVSE 110 may determine state 5B when the voltage of the pilot signal is less than 10 volts and the voltage of the proximity signal is above 2 volts. The EVSE 110 may, responsive to determining state 5B, cause a charging session to be terminated.

Figure 32:
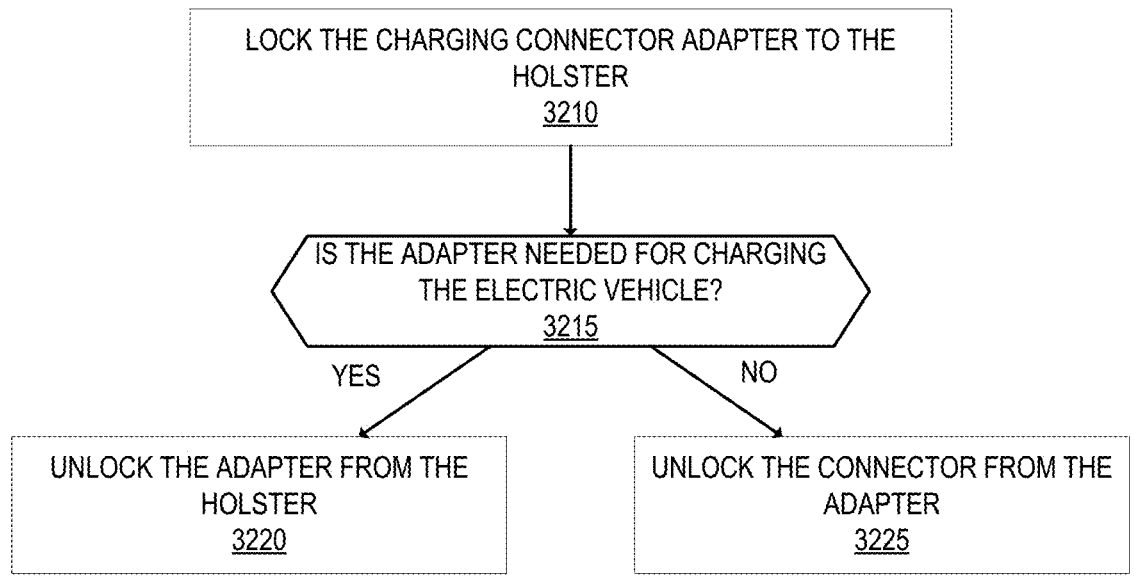
FIG. 32 is a flow diagram illustrating exemplary operations performed by an EVSE according to an embodiment.

FIG. 32 is a flow diagram illustrating exemplary operations performed by an EVSE according to an embodiment. The operations of FIG. 32 are described with respect to the exemplary embodiments shown in FIGS. 1-29. However, the operations of FIG. 32 can be performed by embodiments different from those shown in FIGS. 1-29, and the embodiments shown in FIGS. 1-29 can perform operations different from those described in FIG. 32.

The EVSE 110 includes at least one charging cable 104 that terminates with a charging cable connector 115 and an adapter 120 that is nested within a holster 125. The adapter 120 allows a different type of charging connector to be used. As an example, the charging cable connector 115 may be CCS1 compliant and the adapter 120 may be a CCS1-to-NACS adapter. The holster 125 may include an inlet to receive the CCS1-to-NACS adapter.

At operation 3210, the EVSE 110 locks a charging connector adapter 120 to a holster 125 of the EVSE 110. The charging connector adapter 120 is nested within the holster of the EVSE. The holster 125 may include an adapter locking unit 1310 to lock and unlock the charging connector adapter 120 to and from the holster 125. The adapter locking unit 1310 may include a spring-loaded latch that is controlled by a linearly actuated motor 1415. As a condition for unlocking the adapter 120 (e.g., retracting the latch 1410), the EVSE 110 must detect (e.g., with a sensor and/or through a pilot signal/proximity signal) that the charging connector adapter 120 is present. As examples, the sensor may be a magnetic field sensor (e.g., a Reed switch, a Hall effect sensor), an optical sensor, an infrared sensor, a mechanical leaf or pushbutton switch, an inductive proximity sensor, or a capacitive proximity sensor. The charging connector adapter 120 can be inserted back into the holster 125 with the latch 1410 in a locked position by overcoming the spring force. Thus, the EVSE 110 may lock the charging connector adapter 120 responsive to the charging connector adapter 120 being inserted into the holster 125.

Next, at operation 3215, the EVSE 110 determines whether an electric vehicle that is to be charged at the EVSE 110 through the charging cable 104 with the charging cable connector 115 is to use the adapter 120. The determination whether to use the adapter 120 can be done in different ways. For instance, the electric vehicle operator may specify or indicate their need to use the adapter 120. For example, the electric vehicle operator may specify the type of vehicle to be charged (e.g., year, model, make) and the EVSE 110 may determine based on the type of vehicle whether the vehicle needs the adapter 120 for charging. As another example, the electric vehicle operator may specify the type of connector their vehicle uses (e.g., whether it corresponds to the adapter 120 or the connector 115). The electric vehicle operator may provide this information using a mobile application, using a web application, using an on-board infotainment system on their vehicle, using a user interface of the EVSE, and/or pressing the latch button 105 for a predetermined duration and/or a number of times within a predetermined period. This information can be provided at the time of charging or may be provided prior to charging and saved in a profile associated with the vehicle and/or operator. As another example, the EVSE may perform a vehicle recognition (e.g., using a camera on the EVSE) and determine whether the adapter 120 is needed.

In the embodiment of FIG. 32, the connector 115 is locked to the adapter 120 that is itself locked to the holster 125. As a result, the connector 115 cannot be removed from the holster 125 without the connector 115 unless the connector 115 is unlocked from the adapter 120.

If the adapter 120 is to be used, then operation 3220 is performed. If the adapter 120 is not to be used, then operation 3225 is performed. At operation 3220 (the adapter 120 is to be used), the EVSE 110 unlocks the adapter 120 from the holster 125. The EVSE 110 may unlock the adapter 120 from the holster 125 by causing the linearly actuated motor 1415 to retract the latch 1410 thereby releasing the lock. Prior to unlocking the adapter 120, the EVSE 110 first detects (e.g., with a sensor and/or through a pilot signal/proximity signal) that the adapter 120 is present. As examples, the sensor may be a magnetic field sensor (e.g., a Reed switch, a Hall effect sensor), an optical sensor, an infrared sensor, a mechanical leaf or pushbutton switch, an inductive proximity sensor, or a capacitive proximity sensor. If the connector 115 and/or the adapter 120 is not present, then the EVSE 110 does not unlock the adapter 120 from the holster 125. Because in this embodiment the connector 115 is already locked to the adapter 120, the vehicle operator may then remove the connector 115 with the attached adapter 120 and insert the adapter 120 into their vehicle inlet. The adapter 120 is locked again to the holster 125 when the adapter 120 is returned to the holster 125.

At operation 3225 (the adapter 120 is not to be used), the EVSE 110 unlocks the connector 115 from the adapter 120. With respect to the embodiments that use an electromagnet to control movement of a locking pin (e.g., FIGS. 17-19), the EVSE 110 activates the electromagnet to move a locking pin to an unlocked position to allow the connector 115 to be removed from the adapter 120. For example, with respect to FIGS. 17-19, the EVSE 110 activates the electromagnet 1710 to pull back the locking pin plunger 1707 and thus the locking pin 410. This overcomes the spring force of the spring 1706 that causes the locking pin 410 to be in an unlocked position where the connector 115 can be removed from the adapter 120. The adapter 120 may remain locked to the holster 125. With respect to the embodiments that use an adapter locking pin with an undercut slot for a ball-lock quick release (e.g., FIGS. 20-23), the EVSE 110 inserts the ball-lock quick release pin 2007 via a linear actuator to engage the adapter locking pin 2005 and overcome the spring force to move the adapter locking pin 2005 to an unlocked position. This allows the connector 115 to be removed from the adapter 120. The adapter 120 may remain locked to the holster 125. The connector 115 is locked to the adapter 120 again when the connector 115 is inserted back into the holster 125. With respect to the embodiments that use a latch with an attached magnet that is controlled by a magnet that is external to the adapter 120 (e.g., FIGS. 24-29), the EVSE 110 moves the external magnet 2710 to an unlocked position to allow the connector 115 to be removed from the adapter 120. For example, the external magnet 2710 is moved to a position such that the magnetic force of the magnet 2710 attracts the internal magnet 2510, which prevents the latch 2420 from hooking to the hook portion 1708 of the latch 210 of the connector 115. The adapter 120 may remain locked to the holster 125. The connector 115 is locked to the adapter 120 again when the connector 115 is inserted back into the holster 125.

Figure 33:
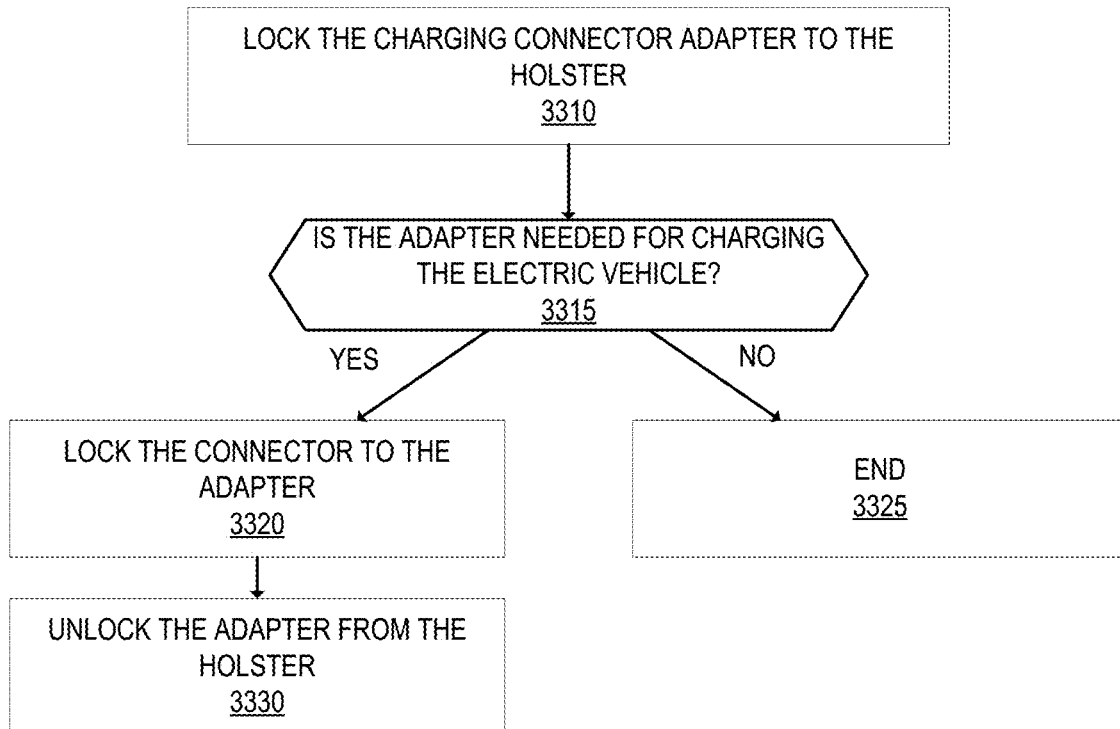
FIG. 33 is a flow diagram illustrating exemplary operations performed by an EVSE according to an embodiment.

FIG. 33 is a flow diagram illustrating exemplary operations performed by an EVSE according to an embodiment. The operations of FIG. 33 are described with respect to the exemplary embodiments shown in FIGS. 1-29. However, the operations of FIG. 33 can be performed by embodiments different from those shown in FIGS. 1-29, and the embodiments shown in FIGS. 1-29 can perform operations different from those described in FIG. 33.

In the embodiment of FIG. 33, the connector 115 is not locked to the adapter 120 when the adapter 120 is locked and nested within the holster 125. The connector 115 can be freely removed from the adapter 120 while the adapter 120 is locked to the holster 125. With respect to the embodiments that use an electromagnet to move the locking pin (e.g., FIGS. 17-19), the EVSE 110 keeps current running through the electromagnet 1710 to keep the locking pin plunger 1707 pulled back and the locking pin 410 in an unlocked position. With respect to the embodiments that use an adapter locking pin with an undercut slot for a ball-lock quick release (e.g., FIGS. 20-23), the EVSE 110 keeps the ball-lock quick release pin 2007 engaged with the adapter locking pin 2005 to keep the adapter locking pin 2005 in an unlocked position. With respect to the embodiments that use a latch with an attached magnet that is controlled by a magnet that is external to the adapter 120 (e.g., FIGS. 24-29), the EVSE 110 keeps the external magnet 2710 in a position to apply a magnetic force that attracts the internal magnet 2510 that prevents the latch 2420 from hooking to the latch 210 of the connector 115.

The EVSE 110 includes at least one charging cable 104 that terminates with a charging cable connector 115 and an adapter 120 that is nested within a holster 125. The adapter 120 allows a different type of charging connector to be used. As an example, the charging cable connector 115 may be CCS1 compliant and the adapter 120 may be a CCS1-to-NACS adapter. The holster 125 may include an inlet to receive the CCS1-to-NACS adapter.

At operation 3310, the EVSE 110 locks a charging connector adapter 120 to a holster 125 of the EVSE 110. The operation 3310 is like the operation 3210. The charging connector adapter 120 is nested within the holster of the EVSE. The holster 125 may include an adapter locking unit 1310 to lock and unlock the charging connector adapter 120 to and from the holster 125. The adapter locking unit 1310 may include a spring-loaded latch that is controlled by a linear actuated motor 1415. As a condition for unlocking the adapter 120 (e.g., retracting the latch 1410), the EVSE 110 must detect (e.g., with a sensor and/or through a pilot signal/proximity signal) that the charging connector adapter 120 is present and the connector 115 is connected to the adapter 120. As examples, the sensor may be a magnetic field sensor (e.g., a Reed switch, a Hall effect sensor), an optical sensor, an infrared sensor, a mechanical leaf or pushbutton switch, an inductive proximity sensor, or a capacitive proximity sensor. The charging connector adapter 120 can be inserted back into the holster 125 with the latch 1410 in a locked position by overcoming the spring force. Thus, the EVSE 110 may lock the charging connector adapter 120 responsive to the charging connector adapter 120 being inserted into the holster 125.

Next, at operation 3315, the EVSE 110 determines whether an electric vehicle that is to be charged at the EVSE 110 through the charging cable 104 with the charging cable connector 115 is to use the adapter 120. The operation 3315 is like the operation 3215. The determination whether to use the adapter 120 can be done in different ways. For instance, the electric vehicle operator may specify or indicate their need to use the adapter 120. For example, the electric vehicle operator may specify the type of vehicle to be charged (e.g., year, model, make) and the EVSE 110 may determine based on the type of vehicle whether the vehicle needs the adapter 120 for charging. As another example, the electric vehicle operator may specify the type of connector their vehicle uses (e.g., whether it corresponds to the adapter 120 or the connector 115). The electric vehicle operator may provide this information using a mobile application, using a web application, using an on-board infotainment system on their vehicle, using a user interface of the EVSE and/or pressing the latch button 105 for a predetermined duration and/or a number of times within a predetermined period. This information can be provided at the time of charging or may be provided prior to charging and saved in a profile associated with the vehicle and/or operator. As another example, the EVSE may perform a vehicle recognition (e.g., using a camera on the EVSE) and determine whether the adapter 120 is needed.

If the adapter 120 is to be used, then operation 3320 is performed. At operation 3320, since the connector 115 is not locked to the adapter 120, the EVSE 110 locks the connector 115 to the adapter 120. With respect to the embodiments that use an electromagnet to move the locking pin (e.g., FIGS. 17-19), the EVSE 110 deactivates the electromagnet 1710 to release the locking pin plunger 1707 and cause the spring 1706 to return the locking pin 410 to the locked position. With respect to the embodiments that use a latch with an attached magnet that is controlled by a magnet that is external to the adapter 120 (e.g., FIGS. 24-29), the EVSE 110 moves the external magnet 2710 to a position such that its magnetic force does not attract the internal magnet 2510. In such a locked position, the hook end 2515 of the latch 2420 hooks on the hook portion 1708 of the latch 210 such that the connector 115 is locked to the adapter 120.

Next, at operation 3330, the EVSE unlocks the adapter 120 from the holster 125. The EVSE 110 may unlock the adapter 120 from the holster 125 by causing the linearly actuated motor 1415 to retract the latch 1410 thereby releasing the lock. Prior to unlocking the adapter 120, the EVSE 110 first detects (e.g., with a sensor and/or through a pilot signal/proximity signal) that the adapter 120 is present. As examples, the sensor may be a magnetic field sensor (e.g., a Reed switch, a Hall effect sensor), an optical sensor, an infrared sensor, a mechanical leaf or pushbutton switch, an inductive proximity sensor, or a capacitive proximity sensor. If the adapter 120 is not present, then the EVSE 110 does not unlock the adapter 120 from the holster 125. The vehicle operator may then remove the connector 115 with the attached adapter 120 and insert the adapter 120 into their vehicle inlet.

When the adapter 120 is returned to the holster 125, the EVSE 110 unlocks the connector 115 from the adapter 120. With respect to the embodiments that use an electromagnet to move the locking pin (e.g., FIGS. 17-19), the EVSE 110 keeps current running through the electromagnet 1710 to keep the locking pin plunger 1707 pulled back and the locking pin 410 in an unlocked position. With respect to the embodiments that use an adapter locking pin with an undercut slot for a ball-lock quick release (e.g., FIGS. 20-23), the EVSE 110 keeps the ball-lock quick release pin 2007 engaged with the adapter locking pin 2005 to keep the adapter locking pin 2005 in an unlocked position. With respect to the embodiments that use a latch with an attached magnet that is controlled by a magnet that is external to the adapter 120 (e.g., FIGS. 24-29), the EVSE 110 moves the external magnet 2710 to an unlocked position to allow the connector 115 to be removed from the adapter 120. For example, the external magnet 2710 is moved to a position such that the magnetic force of the magnet 2710 attracts the internal magnet 2510, which prevents the latch 2420 from hooking to the hook portion 1708 of the latch 210 of the connector 115.

If the adapter 120 is not to be used, since the connector 115 is not locked to the adapter 120, the connector 115 can be freely removed from the adapter 120. Therefore, at operation 3325, no further operations are needed to allow the correct connector to be used for charging the electric vehicle of the operator.

Figure 34:
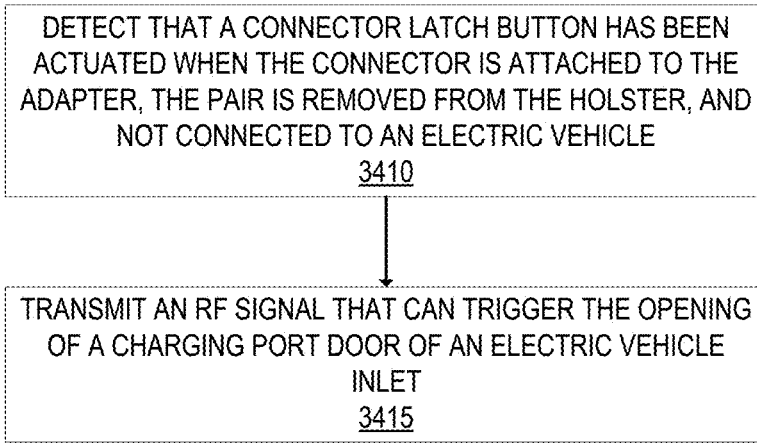
FIG. 34 is a flow diagram illustrating exemplary operations performed by an EVSE according to an embodiment.

FIG. 34 is a flow diagram illustrating exemplary operations performed by an EVSE according to an embodiment. The operations of FIG. 34 are described with respect to the exemplary embodiment shown in FIGS. 24-31.

At operation 3410, the EVSE 110 detects that the button 105 on the connector 115 has been actuated when the connector 115 is attached to the adapter 120, the pair is removed from the holster 125, and the adapter 120 is not connected to an electric vehicle. For example, the EVSE 110 detects a voltage of the control pilot signal in a certain range (e.g., greater than 10 volts and lower than 11 volts (e.g., 10.5 volts)), a voltage of the proximity signal in a certain range (e.g., between 0.5 volts and 1 volts), and a presence sensor (e.g., a magnetic field sensor) indicates that the adapter 120 is not within the holster 125. Next, at operation 3415, the EVSE 110 transmits an RF signal that can trigger the opening of a charging port door of an electric vehicle inlet. The RF signal may also trigger the unlocking of the charging port door. The RF transmitter may be included in the EVSE 110, the connector 115, or the adapter 120.

Figure 35:
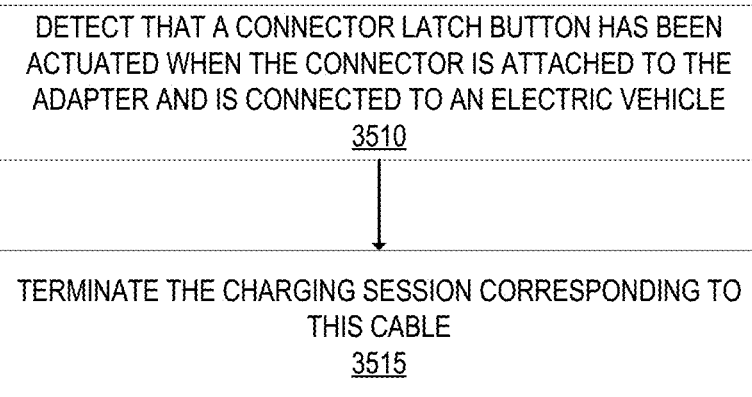
FIG. 35 is a flow diagram illustrating exemplary operations performed by an EVSE according to an embodiment.

FIG. 35 is a flow diagram illustrating exemplary operations performed by an EVSE according to an embodiment. The operations of FIG. 35 are described with respect to the exemplary embodiment shown in FIGS. 24-31.

At operation 3510, the EVSE 110 detects that the button 105 on the connector 115 has been actuated when the connector 115 is attached to the adapter 120 and the adapter 120 is connected to an electric vehicle. For example, the EVSE 110 detects a voltage of the control pilot signal in a certain range (e.g., less than 10 volts), a voltage of the proximity signal in a certain range (e.g., above 2 volts).

Next, at operation 3515, the EVSE 110 terminates a charging session that is ongoing. Terminating the charging session may include opening a set of contactors on the EVSE 110 to stop the flow of current.

Figure 36:
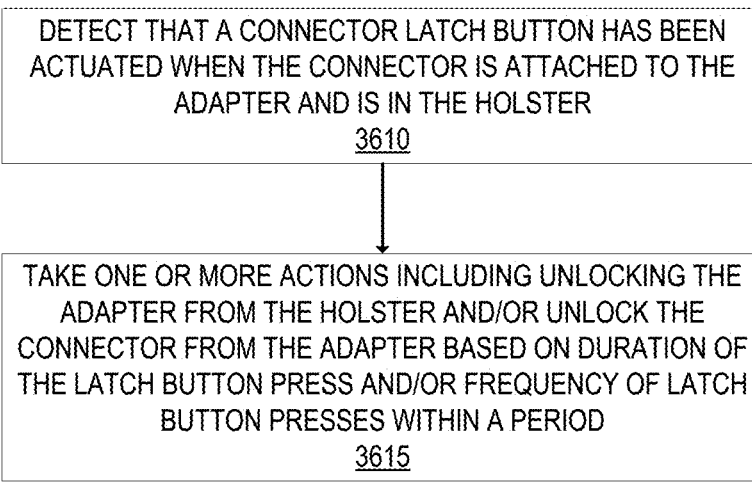
FIG. 36 is a flow diagram illustrating exemplary operations performed by an EVSE according to an embodiment.

FIG. 36 is a flow diagram illustrating exemplary operations performed by an EVSE according to an embodiment. The operations of FIG. 36 are described with respect to the exemplary embodiment shown in FIGS. 24-31.

At operation 3610, the EVSE 110 detects that the button 105 on the connector 115 has been actuated when the connector 115 is attached to the adapter 120 and the pair is in the holster 125. As an example, the EVSE 110 detects that the voltage of the pilot signal is greater than 10 volts but under 11 volts (e.g., 10.5 volts), the voltage of the proximity signal is between 0.5 volts and 1 volt (e.g., 0.7 volts), and the presence sensor indicates that the adapter 120 is within the holster inlet of the holster 125.

Next, at operation 3615, the EVSE 110 takes one or more actions including unlocking the adapter 120 from the holster 125 and/or unlocking the connector 115 from the adapter 120 depending on the duration of the press of the latch button 105 and/or the frequency of presses of the latch button 105 within a period. The EVSE 110 may determine the duration of the press of the latch button 105 by measuring the voltage of the proximity signal over a predefined period. For example, a long press may be determined if the voltage of the proximity signal is between 0.5V to 1V over a predetermined duration. As another example, a short press may be determined if the voltage of the proximity signal raises to between 0.5V to 1V for less than the predetermined duration (e.g., it goes back down to 0.1V to 0.5V). As another example, a double press may be determined if the voltage of the proximity signal raises to between 0.5V to 1V for less than a first predetermined duration (e.g., it goes back down to 0.1V to 0.5V) and the voltage of the proximity signal again raises to between 0.5V to 1V within a predetermined period of the prior detected press. As an example, the EVSE 110 may be configured to unlock the adapter 120 from the holster 125 if the EVSE 110 detects the latch button 105 is pressed down greater than a duration (e.g., a 'long' press). As another example, the EVSE 110 may be configured to unlock the connector 115 from the adapter 120 responsive to detecting that the latch button 105 is pressed a number of times in succession during a period (e.g., double pressing).

Figure 37:
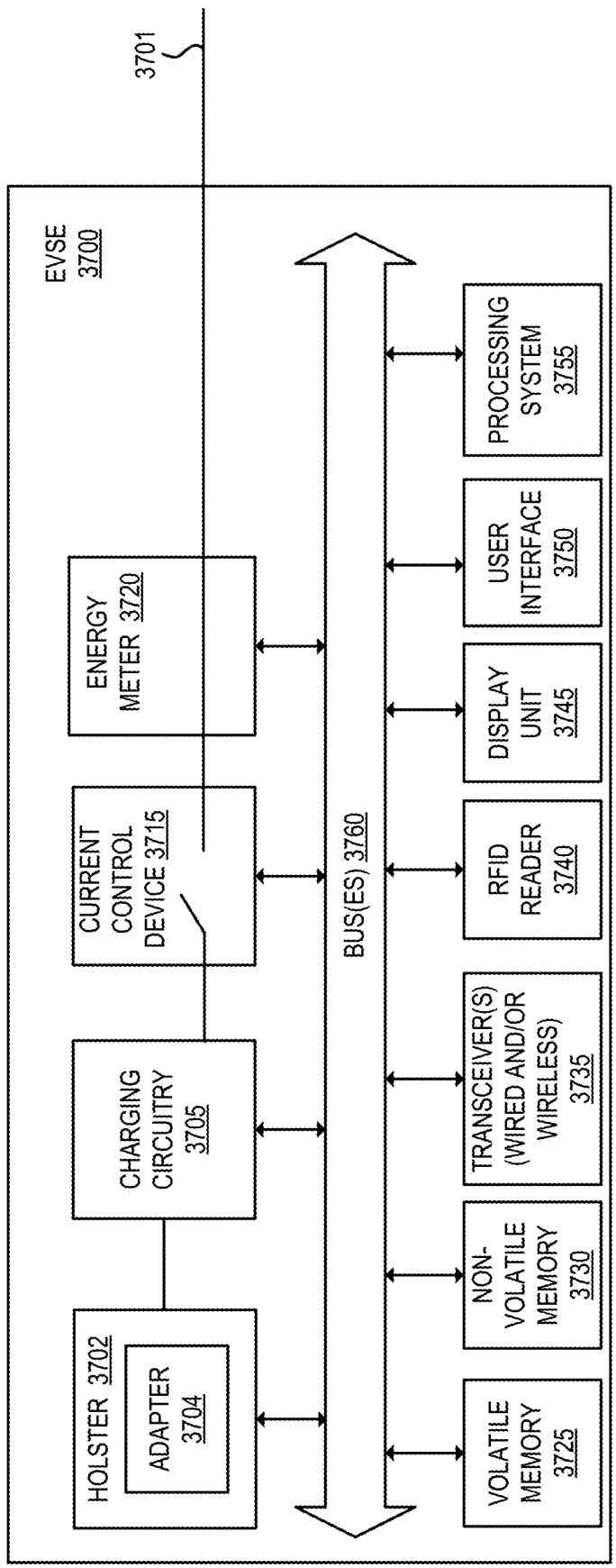
FIG. 37 shows an exemplary embodiment of an EVSE according to an embodiment.

FIG. 37 shows an exemplary embodiment of an EVSE according to an embodiment. The EVSE 110 may take the form of the EVSE 3700. Although several components are illustrated as being included in the EVSE 3700, in some embodiments additional, different, or less components may be used in the EVSE 3700. For example, some EVSE may not include a display or a user interface. Other EVSE may not include an RFID reader or an energy meter. Other EVSE may include one or more lights that can provide visual indications.

As illustrated in FIG. 37, the EVSE 3700 includes the holster 3702 (which may include the adapter 3704), the charging circuitry 3705, the current control device 3715, the energy meter 3720, the volatile memory 3725, the non-volatile memory 3730 (e.g., hard drive, flash, PCM, etc.), one or more transceiver(s) 3735 (e.g., wired transceiver(s) (e.g., Ethernet, power line communication (PLC), etc.) and/or wireless transceiver(s) (e.g., 802.15.4 (e.g., ZigBee, etc.), RF, Bluetooth, Wi-Fi, Infrared, GPRS/GSM, CDMA, etc.)), the RFID reader 3740, the display unit 3745, the user interface 3750, and the processing system 3755 (e.g., one or more microprocessors and/or a system on an integrated circuit), which may be coupled with one or more buses 3760.

The holster 3702 holds the adapter 3704 when not in use and can also hold a connector (e.g., a CCS connector) when not in use. The charging circuitry 3705 is circuitry for an attached charging cord (e.g., with a CCS connector). While FIG. 37 illustrates a single holster 3702, the EVSE 3700 may include multiple charging holsters and which may be the same or different types.

The current control device 3715 controls the current flowing on the power line 3701. For example, in some embodiments the current control device 3715 energizes the charging circuitry 3705 (e.g., by completing the circuit to the power line 3701) or de-energizes the charging circuitry 3705 (e.g., by breaking the circuit to the power line 3701). The current control device 3715 may be a set of contactors. In some embodiments the current control device 3715 energizes the charging circuitry 3705 responsive to receiving a command from a server that indicates charging is authorized.

The energy meter 3720 measures the amount of electricity that is flowing on the power line 3701 through the charging circuitry 3705. While in one embodiment the energy meter 3720 measures current flow, in an alternative embodiment the energy meter 3720 measures power draw. The energy meter 3720 may be an induction coil or other devices suitable for measuring electricity. While the energy meter 3720 is illustrated as being included within the EVSE 3700, in other embodiments the energy meter 3720 is exterior to the EVSE 3700 but capable of measuring the amount of electricity flowing on the power line 3701 through the charging circuitry 3705.

The RFID reader 3740 reads RFID tags from RFID enabled devices (e.g., smartcards, key fobs, contactless credit cards, etc.), embedded with RFID tag(s) of operators that want to use the EVSE 3700. For example, in some embodiments a vehicle operator can wave/swipe an RFID enabled device near the RFID reader 3740 to provide an access credential for use of the EVSE 3700.

The transceiver(s) 3735 transmit and receive messages. For example, the transceiver(s) 3735 may transmit authorization requests to the EV charging network server, receive commands from the EV charging network server indicating whether the charging session is authorized, etc. The transceiver(s) 3735 may include an RF transmitter that can trigger the opening of a charging port door of an electric vehicle inlet as described herein.

The display unit 3745 is used to display messages to vehicle operators including charging status, confirmation messages, error messages, notification messages, etc. The user interface 3750 allows operators to interact with the EVSE 3700. By way of example, the user interface 3750 allows electric vehicle operators to present an access credential, enter in account and/or payment information, etc. As another example, the user interface 3750 may allow an electric vehicle operator to specify or indicate an intention to use the adapter 3704.

The processing system 3755 may retrieve instruction(s) from the volatile memory 3725 and/or the non-volatile memory 3730 and execute the instructions to perform operations for the electric vehicle charging station.

Some portions of the present invention may be implemented using code and data stored and executed on the EVSE. The code and/or data may be stored in machine-readable media, such as machine-readable storage media (e.g., magnetic disks; optical disks; random access memory; read only memory; flash memory devices; phase-change memory) and/or machine-readable communication media (e.g., electrical, optical, acoustical or other form of propagated signals-such as carrier waves, infrared signals, digital signals, etc.). Thus, the storage device(s) of a given EVSE typically stores code and/or data for execution on a set of one or more processors of that EVSE. Of course, one or more parts of an embodiment of the invention may be implemented using different combinations of software, firmware, and/or hardware.

In the preceding description, numerous specific details are set forth to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in an electric vehicle supply equipment (EVSE), comprising:
   locking a charging connector adapter to a holster of the EVSE, wherein the charging connector adapter is nested within the holster of the EVSE;
   determining that an electric vehicle that is to be charged at the EVSE through a charging cable with a charging connector is to use the charging connector adapter;
   automatically locking the charging connector to the charging connector adapter;
   automatically unlocking the charging connector adapter from the holster of the EVSE thereby allowing the charging cable with the charging connector adapter to be removed from the holster and used for connecting the charging connector adapter to an inlet of the electric vehicle; and
   responsive to the charging connector adapter being inserted back into the holster, locking the charging connector adapter to the holster of the EVSE, and unlocking the charging connector from the charging connector adapter.

2. The method of claim 1, wherein the charging connector is Combined Charging System (CCS) Combo 1 compliant, and wherein the charging connector adapter is adapted to connect to an electric vehicle inlet that is North American Charging Standard (NACS) compliant.

3. The method of claim 1, wherein automatically locking the charging connector to the charging connector adapter includes deactivating an electromagnet that moves a locking pin of the charging connector adapter to a locked position thereby preventing a latch of the charging connector to be unlatched, wherein the electromagnet is external to the charging connector adapter.

4. The method of claim 1, wherein automatically locking the charging connector to the charging connector adapter includes using a linear actuator to disengage a locking pin of the charging connector adapter with a ball-lock quick release pin to move the locking pin to a locked position thereby preventing a latch of the charging connector to be unlatched.

5. The method of claim 1, wherein automatically locking the charging connector to the charging connector adapter includes using a linear actuator to move a first magnet of the holster to a position where a magnetic force of the first magnet does not attract a second magnet that is attached to a latch of the charging connector adapter thereby preventing a latch of the charging connector to be unlatched.

6. The method of claim 1, wherein automatically unlocking the charging connector adapter from the holster of the EVSE includes retracting a spring-loaded latch that latches to the charging connector adapter.

7. The method of claim 1, wherein determining that the electric vehicle that is to be charged at the EVSE through the charging cable with the charging connector is to use the charging connector adapter includes receiving a communication that specifies or indicates an intention to use the charging connector adapter.

8. An electric vehicle supply equipment (EVSE), comprising:
a charging connector adapter that is nested within a holster, wherein the charging connector adapter is locked to a charging connector of a charging cable when the charging connector adapter is to be used to couple to an electric vehicle, and wherein the charging connector adapter is unlocked from the charging connector when the charging connector adapter is not to be used to couple to the electric vehicle;
the holster including an adapter locking unit to lock and unlock the charging connector adapter to and from the holster;
a non-transitory machine-readable storage medium that provides instructions to be executed by a set of one or more processors to perform operations including:
responsive to a determination that the charging connector adapter is to be used for charging the electric vehicle,
cause the charging connector adapter to be locked to the charging connector, and
cause the adapter locking unit to unlock the charging connector adapter from the holster thereby allowing the charging cable with the charging connector adapter to be removed from the holster and used for connecting the charging connector adapter to an inlet of the electric vehicle,
responsive to the charging connector adapter being inserted back into the holster, cause the adapter locking unit to lock the charging connector adapter to the holster, and
cause the charging connector adapter to unlock from the charging connector.

9. The EVSE of claim 8, wherein the charging connector is Combined Charging System (CCS) Combo 1 compliant, and wherein the charging connector adapter is adapted to connect to an electric vehicle inlet that is North American Charging Standard (NACS) compliant.

10. The EVSE of claim 8, wherein the holster further includes an electromagnet, and wherein the operation to cause the charging connector adapter to be unlocked from the charging connector includes activating the electromagnet that moves a locking pin of the charging connector adapter to an unlocked position thereby allowing a latch of the charging connector to be unlatched.

11. The EVSE of claim 8, wherein the holster further includes a ball-lock quick release pin that is controlled by a linear actuator, and wherein the operation to cause the charging connector adapter to be unlocked from the charging connector includes causing the linear actuator to insert the ball-lock quick release pin to engage a locking pin of the charging connector adapter and move the locking pin to an unlocked position thereby allowing a latch of the charging connector to be unlatched.

12. The EVSE of claim 8, wherein the holster further includes a first magnet that is controlled by a linear actuator, and wherein the operation to cause the charging connector adapter to be unlocked from the charging connector includes causing the linear actuator to move the first magnet to a position where a magnetic force attracts a second magnet that is attached to a latch of the charging connector adapter and prevents the latch from latching to the charging connector.

13. The EVSE of claim 8, wherein the operation to cause the adapter locking unit to unlock the charging connector adapter from the holster includes causing the adapter locking unit to retract a spring-loaded latch of the adapter locking unit that latches to the charging connector adapter.

14. The EVSE of claim 8, wherein the operation to determine whether the electric vehicle is to be charged using the charging connector adapter includes receiving a communication that specifies or indicates an intention to use the charging connector adapter.

15. A non-transitory machine-readable storage medium that provides instructions that, if executed by a processing system of an electric vehicle supply equipment (EVSE), will cause said EVSE to perform operations comprising:
causing a charging connector adapter to be locked to a holster of the EVSE, wherein the charging connector adapter is nested within the holster of the EVSE;
responsive to determining that an electric vehicle that is to be charged at the EVSE through a charging cable with a charging connector is to use the charging connector adapter,
causing the charging connector to be locked to the charging connector adapter, and
causing the charging connector adapter to be unlocked from the holster of the EVSE thereby allowing the charging cable with the charging connector adapter to be removed from the holster and used for connecting the charging connector adapter to an inlet of the electric vehicle; and
responsive to the charging connector adapter being inserted back into the holster,
causing the charging connector adapter to be locked to the holster of the EVSE, and
causing the charging connector to be unlocked from the charging connector adapter.

16. The non-transitory machine-readable storage medium of claim 15, wherein the charging connector is Combined Charging System (CCS) Combo 1 compliant, and wherein the charging connector adapter is adapted to connect to an electric vehicle inlet that is North American Charging Standard (NACS) compliant.

17. The non-transitory machine-readable storage medium of claim 15, wherein automatically locking the charging connector to the charging connector adapter includes deactivating an electromagnet that moves a locking pin of the charging connector adapter to a locked position thereby preventing a latch of the charging connector to be unlatched, wherein the electromagnet is external to the charging connector adapter.

18. The non-transitory machine-readable storage medium of claim 15, wherein automatically locking the charging connector to the charging connector adapter includes using a linear actuator to disengage a locking pin of the charging connector adapter with a ball-lock quick release pin to move the locking pin to a locked position thereby preventing a latch of the charging connector to be unlatched.

19. The non-transitory machine-readable storage medium of claim 15, wherein automatically locking the charging connector to the charging connector adapter includes using a linear actuator to move a first magnet of the holster to a position where a magnetic force of the first magnet does not attract a second magnet that is attached to a latch of the charging connector adapter thereby preventing a latch of the charging connector to be unlatched.

20. The non-transitory machine-readable storage medium of claim 15, wherein automatically unlocking the charging connector adapter from the holster of the EVSE includes retracting a spring-loaded latch that latches to the charging connector adapter.

\* \* \* \* \*